US012720498B2

(12) United States Patent
Liu et al.

(10) Patent No.: US 12,720,498 B2
(45) Date of Patent: Aug. 25, 2026

(54) INFORMATION TRANSMISSION METHOD, INFORMATION TRANSMISSION APPARATUS, ELECTRONIC DEVICE, AND READABLE STORAGE MEDIUM

(71) Applicant: VIVO MOBILE COMMUNICATION CO., LTD., Guangdong (CN)

(72) Inventors: Jinhua Liu, Guangdong (CN); Huan Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 350 days.

(21) Appl. No.: 18/305,200

(22) Filed: Apr. 21, 2023

(65) Prior Publication Data

US 2023/0262663 A1 Aug. 17, 2023

Related U.S. Application Data

(63) Continuation of application No. PCT/CN2021/124922, filed on Oct. 20, 2021.

(30) Foreign Application Priority Data

Oct. 22, 2020 (CN) ........................ 202011141262.1

(51) Int. Cl.
*H04W 72/02* (2009.01)
*H04W 36/00* (2009.01)
(Continued)

(52) U.S. Cl.
CPC ....... *H04W 72/02* (2013.01); *H04W 36/0069* (2018.08); *H04W 72/0446* (2013.01); *H04W 72/0453* (2013.01)

(58) Field of Classification Search
CPC ............. H04W 26/0069; H04W 72/02; H04W 72/0446; H04W 72/0453
See application file for complete search history.

(56) References Cited

U.S. PATENT DOCUMENTS

2013/0201930 A1 8/2013 Okino et al.
2016/0128073 A1 5/2016 Nagata et al.
(Continued)

FOREIGN PATENT DOCUMENTS

CN 110121191 A 8/2019
CN 110691416 A 1/2020
(Continued)

OTHER PUBLICATIONS

Extended European Search Report for Application No. 21882037.1, dated Jan. 30, 2024, 9 Pages.
(Continued)

*Primary Examiner* — Brian P Cox
(74) *Attorney, Agent, or Firm* — BROOKS KUSHMAN P.C.

(57) ABSTRACT

An information transmission method, an information transmission apparatus, an electronic device, and a readable storage medium. The information transmission method includes: determining, by a first centralized unit, resource configuration coordination information; and sending, by the first centralized unit, a first message carrying the resource configuration coordination information to a second centralized unit.

19 Claims, 17 Drawing Sheets

(51) Int. Cl.
*H04W 72/0446* (2023.01)
*H04W 72/0453* (2023.01)

(56) References Cited

U.S. PATENT DOCUMENTS

2019/0373627 A1 12/2019 Luo et al.
2021/0112616 A1* 4/2021 Karandikar .......... H04W 76/27
2021/0127389 A1 4/2021 Liu et al.
2021/0219340 A1 7/2021 Shi et al.
2021/0227435 A1* 7/2021 Hsieh .................. H04W 36/087
2021/0345345 A1 11/2021 Liu et al.
2022/0345938 A1* 10/2022 Gupta ................. H04W 28/065

FOREIGN PATENT DOCUMENTS

CN 110972328 A 4/2020
CN 111757499 A 10/2020
EP 3849272 A1 7/2021
JP 2014236369 A 12/2014
WO 2011136082 A1 11/2011
WO 2019145878 A1 8/2019
WO 2019246446 A1 12/2019
WO 2020143828 A1 7/2020
WO 2020190263 A1 9/2020
WO 2021028015 A1 2/2021

OTHER PUBLICATIONS

First Office Action for Japanese Application No. 2023-524650, dated Feb. 8, 2024, 5 Pages.
International Search Report and Written Opinion for Application No. PCT/CN2021/124922, dated Jan. 19, 2022, 8 Pages.
Intel Corporation "Inter-CU topology adaptation procedure" 3GPP TSG-RAN WG3 Meeting #109-e, Electronic Meeting, Aug. 2020, R3-204745, 6 Pages.
Fourth Japanese Office Action for Japanese Application No. 2023-524650 mailed Mar. 25, 2025. 19 pages.

* cited by examiner

INFORMATION TRANSMISSION METHOD, INFORMATION TRANSMISSION APPARATUS, ELECTRONIC DEVICE, AND READABLE STORAGE MEDIUM

CROSS-REFERENCE TO RELATED APPLICATIONS

This application is a continuation of PCT International Application No. PCT/CN2021/124922 filed on Oct. 20, 2021, which claims priority to Chinese Patent Application No. 202011141262.1, filed on Oct. 22, 2020, which are incorporated herein by reference in their entireties.

TECHNICAL FIELD

This application pertains to the field of communication technologies, and specifically, relates to an information transmission method, an information transmission apparatus, an electronic device, and a readable storage medium.

BACKGROUND

The integrated access backhaul (IAB) system is a technology for which standards are formulated since NR Rel-16. The IAB system is introduced to address a problem that a wired transmission network is not deployed in place for access points densely deployed, so that when there is no wired transmission network, access points can rely on wireless backhaul.

FIG. 1 is a schematic structural diagram of an IAB system. An IAB node includes a distributed unit (DU) and a mobile termination (MT). After an IAB node has established a complete backhaul link, the IAB node starts its DU function and the DU provides cell services, that is, the DU is capable of providing access services for User Equipments (UE). With an MT, an access point (that is, an IAB node) is able to find an upstream access point (parent IAB node) and establish a wireless connection to a DU of the upstream access point. Such wireless connection is referred to as a backhaul link. One integrated access backhaul loop includes one donor IAB node (or referred to as an IAB donor), and the donor IAB node is directly connected to a wired transmission network.

FIG. 2 is a schematic diagram of a centralized unit-distributed unit (CU-DU) structure of an IAB system. In one integrated access backhaul loop, DUs of all IAB nodes are connected to one CU node, and the CU node configures the DUs through the F1-AP protocol (F1 Application Protocol), and configures MTs through the radio resource control (RRC) protocol.

Both FIG. 3 and FIG. 4 show a network structure of new radio dual connectivity (NR-DC) for UEs (User Equipment, user terminal), and both FIG. 5 and FIG. 6 show a network structure of NR-DC for IAB nodes. UE or an MT of an IAB node separately establishes a connection to two serving DUs (that is, DU1 and DU2). An upstream network structure has two different scenarios. In one scenario, a master gNodeB (MN) and a secondary gNodeB (SN) are controlled by a same CU (FIGS. 3 and 5), and in the other scenario, the MN and the SN are controlled by different CUs (FIGS. 4 and 6), that is, the MN is an MgNB or MCG donor, and the SN is an SgNB or SCG donor.

SUMMARY

According to a first aspect, an embodiment of this application provides an information transmission method, where the method includes:

determining, by a first centralized unit, resource configuration coordination information; and sending, by the first centralized unit, a first message carrying the resource configuration coordination information to a second centralized unit.

According to a second aspect, an embodiment of this application provides an information transmission method, where the method includes:

receiving, by a second centralized unit, a first message sent by a first centralized unit;

obtaining, by the second centralized unit, resource configuration coordination information carried in the first message; and configuring, by the second centralized unit, a resource for a second serving node of a wireless node based on the resource configuration coordination information.

According to a third aspect, an embodiment of this application provides an information transmission method, where the method includes:

obtaining, by a wireless node, resource collision information between a first serving node and a second serving node; and sending, by the wireless node, a third message carrying the resource collision information to a first centralized unit, or sending a fourth message carrying the resource collision information to a second centralized unit, or sending a fifth message carrying the resource collision information to the first serving node, or sending a sixth message carrying the resource collision information to the second serving node.

According to a fourth aspect, an embodiment of this application provides an information transmission method, where the method includes:

receiving, by a first serving node, a fifth message sent by a wireless node;

obtaining, by the first serving node, resource collision information that is between the first serving node and a second serving node and that is carried in the fifth message; and adjusting, by the first serving node, wireless-node scheduling based on the resource collision information.

According to a fifth aspect, an embodiment of this application provides an information transmission method, where the method includes:

receiving, by a second serving node, a sixth message sent by a wireless node;

obtaining, by the second serving node, resource collision information that is between the second serving node and a first serving node and that is carried in the sixth message; and adjusting, by the second serving node, wireless-node scheduling based on the resource collision information.

According to a sixth aspect, an embodiment of this application provides an information transmission apparatus, where the apparatus includes:

a first information determining module, configured to determine resource configuration coordination information; and a first sending module, configured to send a first message carrying the resource configuration coordination information to a second centralized unit.

According to a seventh aspect, an embodiment of this application provides an information transmission apparatus, where the apparatus includes:

a second receiving module, configured to receive a first message sent by a first centralized unit;

a second information determining module, configured to obtain resource configuration coordination information carried in the first message; and a second processing module, configured to configure a resource for a second serving node of a wireless node based on the resource configuration coordination information.

According to an eighth aspect, an embodiment of this application provides an information transmission apparatus, where the apparatus includes:

a third information determining module, configured to obtain resource collision information between a first serving node and a second serving node; and a third sending module, configured to send a third message carrying the resource collision information to a first centralized unit, or send a fourth message carrying the resource collision information to a second centralized unit, or send a fifth message carrying the resource collision information to the first serving node, or send a sixth message carrying the resource collision information to the second serving node.

According to a ninth aspect, an embodiment of this application provides an information transmission apparatus, where the apparatus includes:

a fourth receiving module, configured to receive a fifth message sent by a wireless node;

a fourth information determining module, configured to obtain resource collision information that is with a second serving node and that is carried in the fifth message; and a fourth processing module, configured to adjust wireless-node scheduling based on the resource collision information.

According to a tenth aspect, an embodiment of this application provides an information transmission apparatus, where the apparatus includes:

a fifth receiving module, configured to receive a sixth message sent by a wireless node;

a fifth information determining module, configured to obtain resource collision information that is with a first serving node and that is carried in the sixth message; and a fifth processing module, configured to adjust wireless-node scheduling based on the resource collision information.

According to an eleventh aspect, an embodiment of this application provides an electronic device, where the electronic device includes a processor, a memory, and a program or instructions stored in the memory and capable of running on the processor, and when the program or the instructions are executed by the processor, the steps of the information transmission method according to the first aspect to the fifth aspect are implemented.

According to a twelfth aspect, an embodiment of this application provides a readable storage medium, where a program or instructions are stored in the readable storage medium, and when the program or the instructions are executed by a processor, the steps of the information transmission method according to the first aspect to the fifth aspect are implemented.

According to a thirteenth aspect, an embodiment of this application provides a chip, where the chip includes a processor and a communications interface, the communications interface is coupled to the processor, and the processor is configured to run a program or instructions to implement the steps of the information transmission method according to the first aspect to the fifth aspect.

DETAILED DESCRIPTION

The following clearly describes the technical solutions in the embodiments of this application with reference to the accompanying drawings in the embodiments of this application. Apparently, the described embodiments are only some rather than all of the embodiments of this application.

All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the terms used in this way is interchangeable in appropriate circumstances so that the embodiments of this application can be implemented in other orders than the order illustrated or described herein. In addition, "and/or" in this specification and claims indicates at least one of connected objects, and the symbol "/" generally indicates that the associated objects are in an "or" relationship.

The following describes in detail an information transmission method, an information transmission apparatus, an electronic device, and a readable storage medium provided in the embodiments of this application by using specific embodiments and application scenarios thereof with reference to the accompanying drawings.

During application of the NR-DC network for the UEs or IAB nodes, the inventors have found at least the following problems in the related art:

The UE or the MT of the IAB node is subject to limitation of multiplexing scheduling. When the MN and the SN are controlled by different CUs, if no resource allocation coordination is performed, resource allocation collision between the MCG link and the SCG link may occur, leading to scheduling collision between the MN and the SN and resulting in transmission errors or resource unavailability.

Figure 1:
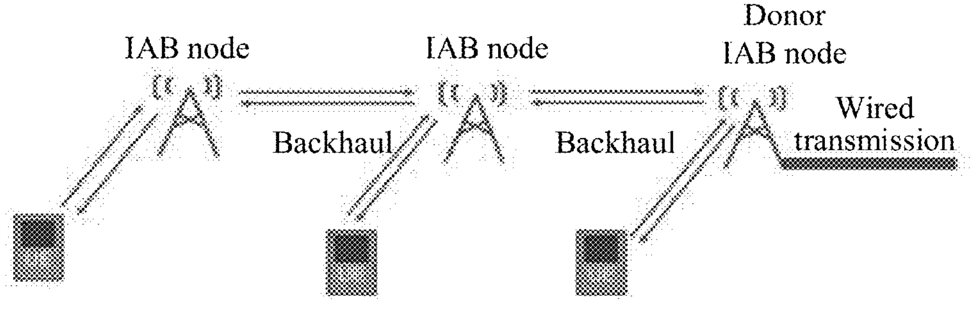
FIG. 1 is a structure diagram of an IAB system in the related art.
Figure 2:
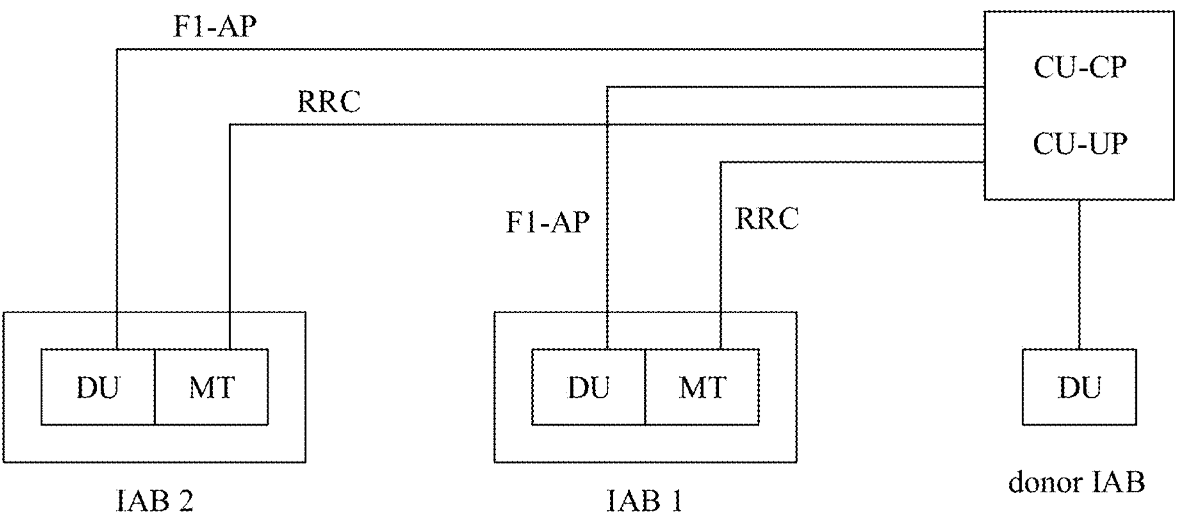
FIG. 2 is a schematic structural diagram of a CU-DU of an IAB system in the related art.
Figure 3:
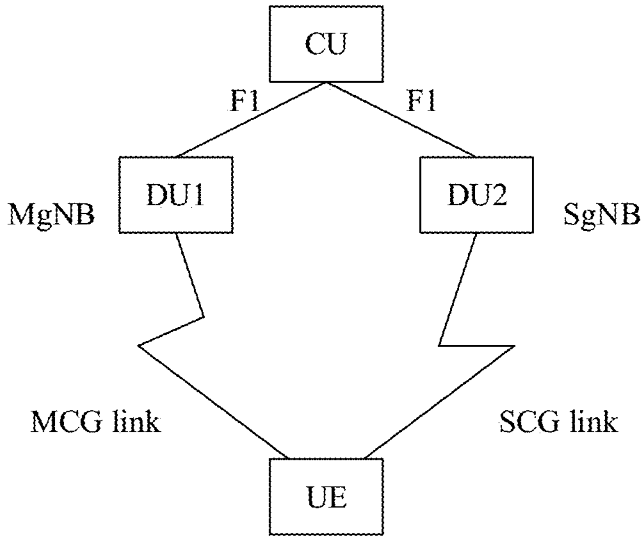
FIG. 3 is a first schematic structural diagram of NR-DC for UE in the related art.
Figure 4:
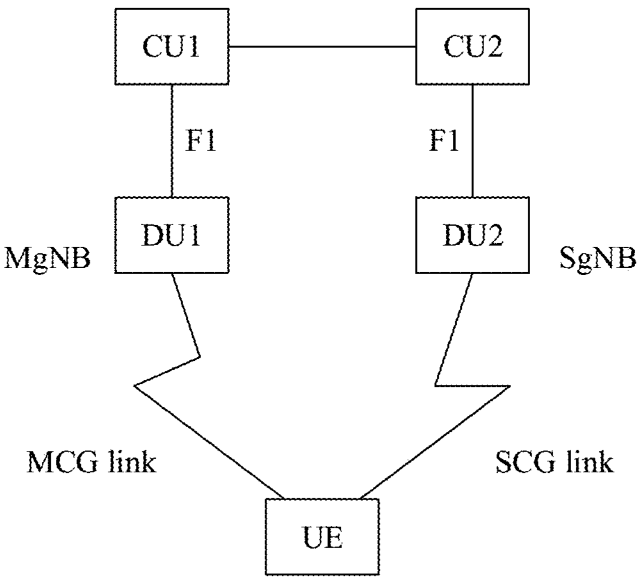
FIG. 4 is a second schematic structural diagram of NR-DC for UE in the related art.
Figure 5:
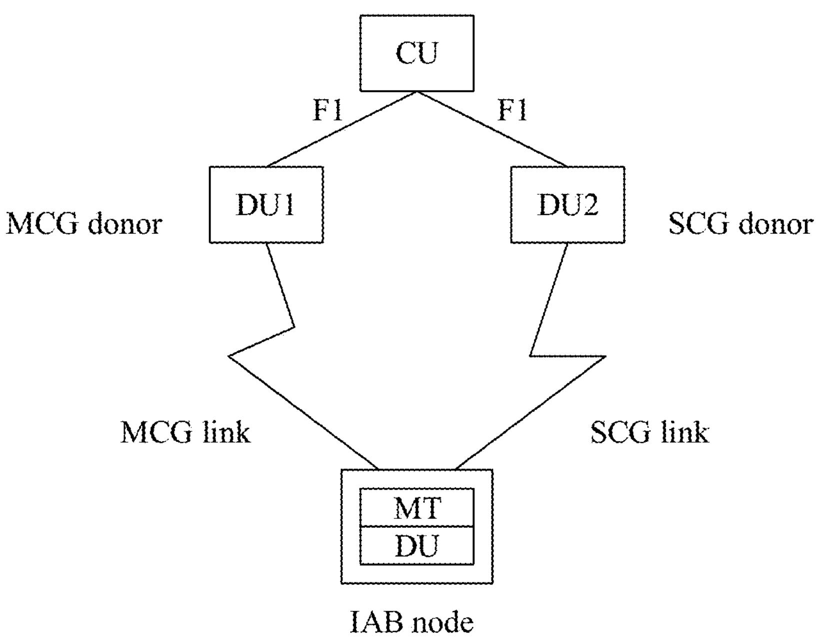
FIG. 5 is a first schematic structural diagram of NR-DC for an IAB node in the related art.
Figure 6:
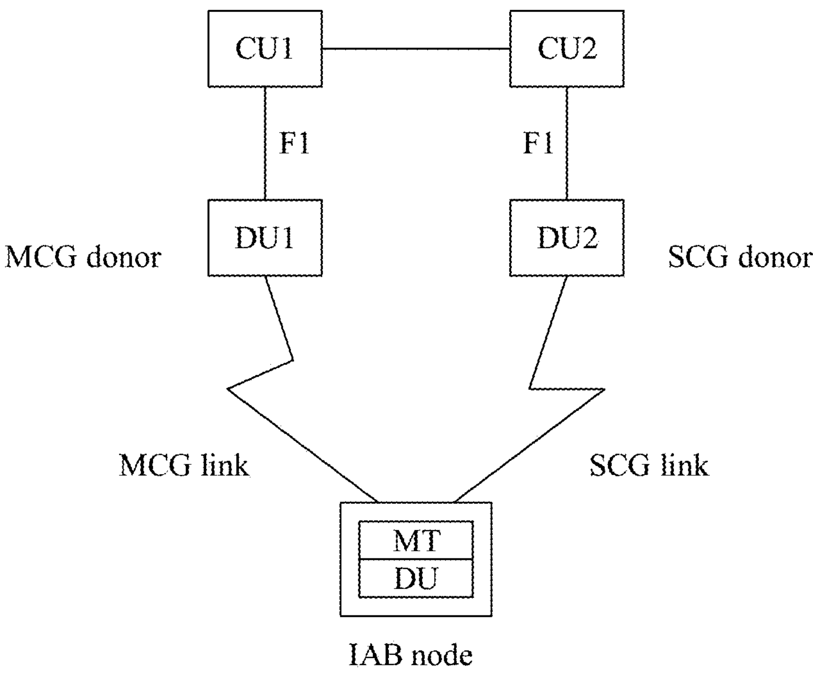
FIG. 6 is a second schematic structural diagram of NR-DC for an IAB node in the related art.
Figure 7:
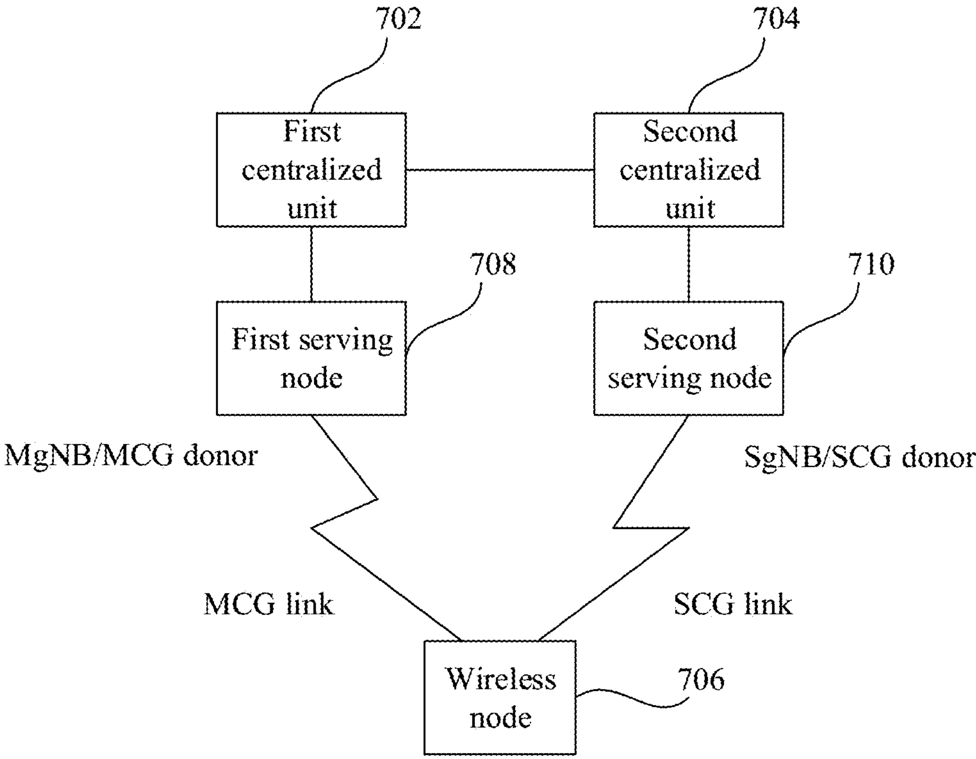
FIG. 7 is a schematic structural diagram of an integrated access backhaul dual connectivity system according to an embodiment of this application.

FIG. 7 is a schematic structural diagram of an integrated access backhaul dual connectivity system according to an embodiment of this application. The integrated access backhaul dual connectivity system includes:

a first centralized unit 702, a second centralized unit 704, a wireless node 706, a first serving node 708, and a second serving node 710, where the wireless node 706 separately establishes a connection to two serving DUs (that is, the first serving node 708 and the second serving node 710); and for an upstream network structure, the serving nodes are controlled by different CUs, and specifically, the first serving node 708 is controlled by the first centralized unit 702, and the second serving node 710 is controlled by the second centralized unit 704.

It should be noted that downstream networks of the first centralized unit 702 and the second centralized unit 704 may each be connected to a plurality of serving nodes, and downstream of the wireless node 706 may also be connected to a plurality of child nodes.

The wireless node 706 may be UE. Correspondingly, the first serving node 708 is a master gNodeB (MgNB), and the second serving node 710 is a secondary gNodeB (SgNB). The wireless node 706 may alternatively be an IAB node, and the IAB node includes a DU and an MT. Correspondingly, the first serving node 708 is an MCG donor (master cell group) and the second serving node 710 is an SCG donor (secondary cell group). A connection between the wireless node 706 and the first serving node 708 is referred to as an MCG link, and a connection between the wireless node 706 and the second serving node 710 is referred to as an SCG link.

In terms of carrier allocation over air interface, the MCG link and the SCG link in the integrated access backhaul dual connectivity system in this embodiment of this application exist in the following several scenarios:

Scenario 1: The MCG link and the SCG link use different carriers of different frequency bands.

Scenario 2: The MCG link and the SCG link use different carriers of one frequency band.

Scenario 3: The MCG link and the SCG link use a same carrier of one frequency band.

The 3rd Generation Partnership Project (3GPP) supports NR-DC using different carriers for the MCG link and the SCG link. Under such premise, in scenario 1, the wireless node 706 may support multiplexing scheduling between the MCG link and the SCG link without restrictions. In scenario 2, multiplexing scheduling between the MCG link and the SCG link is subject to some restrictions in some cases. For example, when a carrier frequency of the MCG link and a carrier frequency of the SCG link are close, with no sufficient frequency isolation, the wireless node 706 cannot perform a transmit/receive operation on the SCG link when performing a receive/transmit operation on the MCG link. However, no such restriction is present in a case that sufficient frequency isolation can be provided between the carrier frequency of the MCG link and the carrier frequency of the SCG link. The frequency isolation herein may be defined by a frequency difference between the carriers. In scenario 3, multiplexing scheduling between the MCG link and the SCG link is subject to largest restrictions, and the wireless node 706 cannot perform a transmit/receive operation on the SCG link when performing a receive/transmit operation on the MCG link.

As described above, the wireless node 706 is subject to restrictions in multiplexing scheduling, and when the MN and the SN are controlled by different centralized units, if resource allocation is not coordinated, resource allocation collision between the MCG link and the SCG link may occur, specifically including:

(1) Uplink-downlink configuration collision: In a case that the MCG link and the SCG link use different carriers of one frequency band or the MCG link and the SCG link use a same carrier of one frequency band, the first centralized unit 702 configures one slot of the first serving node 708 as uplink available, but the second centralized unit 704 configures a same slot of the second serving node 710 as downlink available. When the SN and the MN perform transmission scheduling of the wireless node 706 in the slot at the same time, the wireless node 706 may perform an unpredictable behavior due to simultaneous transmission and reception being not supported. Consequently, signaling or data cannot be transmitted in real time.

(2) Simultaneous scheduling/transmission collision: In a case that the MCG link and the SCG link use a same carrier of one same frequency band, the wireless node 706 is able to transmit only one physical uplink control channel (PUCCH), physical uplink shared channel (PUSCH), or physical downlink shared channel (PDSCH) in a same slot on one carrier. If the MN and the SN configures PUCCH in the same slot or schedule PUSCH or a PDSCH at the same time, the wireless node 706 may perform an unpredictable behavior due to simultaneous transmission and reception being not supported. Consequently, signaling or data cannot be transmitted in real time.

Figure 8:
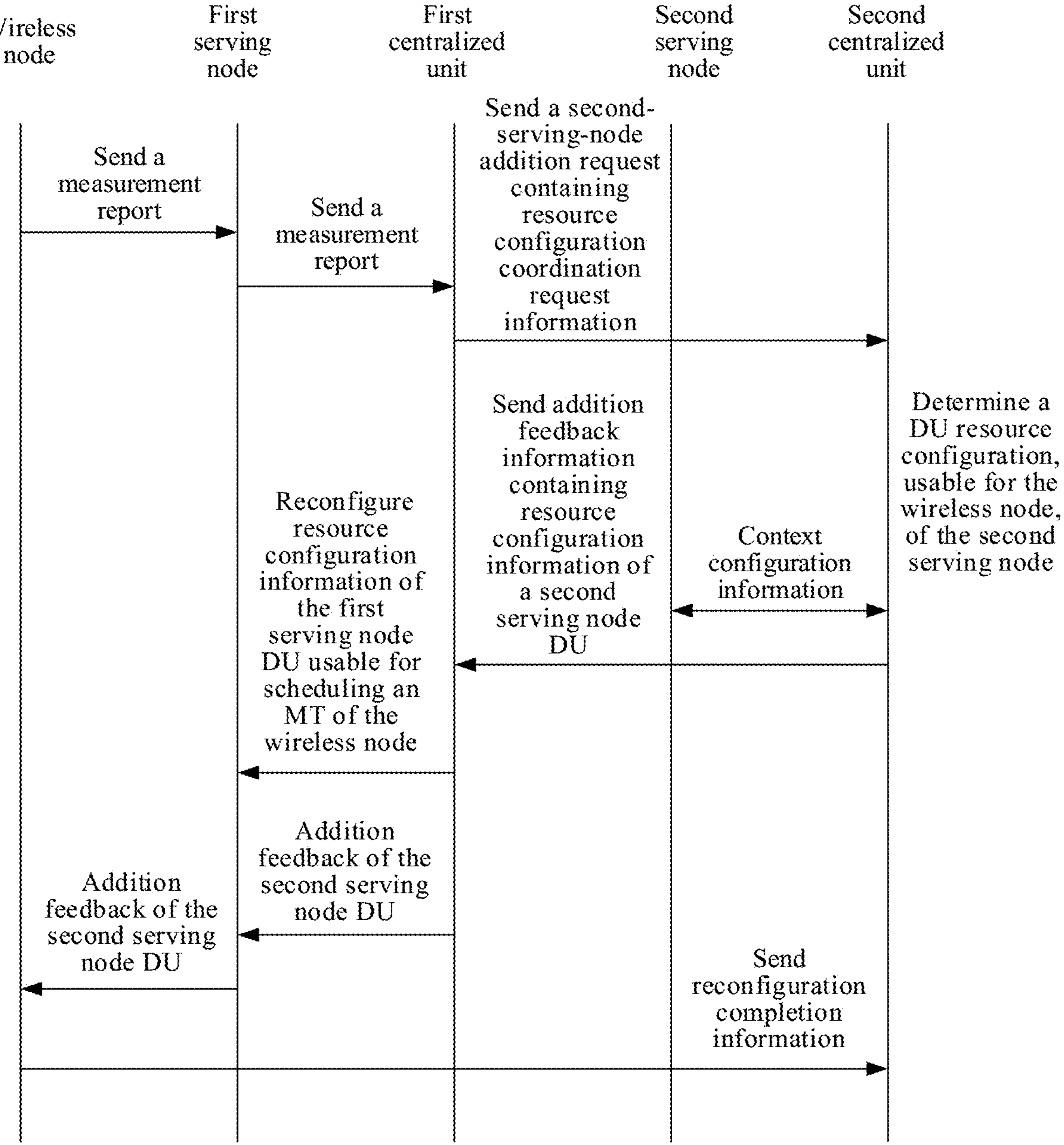
FIG. 8 is a flowchart of resource allocation coordination between a first centralized unit and a second centralized unit according to an embodiment of this application.

In order to resolve the problem of transmission errors or resource unavailability caused by resource allocation collision when an MN (MgNB or MCG donor) and an SN (SgNB or SCG donor) are controlled by different CUs, the embodiments of this application provide a resource allocation coordination method for the integrated access backhaul dual-connectivity system. A process of resource allocation coordination between a first centralized unit and a second centralized unit is shown in FIG. 8. The first centralized unit determines to add a second serving node for a wireless node after receiving a measurement report of surrounding wireless nodes from the wireless node. The second serving node is controlled by the second centralized unit. The measurement report may include signal quality from the second serving node to the wireless node.

When sending a second-serving-node addition request to the second centralized unit, the first centralized unit sends resource configuration coordination request information specific to the first serving node DU and the second serving node DU. Based on the coordination request information, the second centralized unit determines a DU resource configuration, usable for the wireless node, of the second serving node, and sends the resource configuration to the second serving node by using context configuration information. This reduces or avoids a probability that the wireless node cannot correspondingly execute scheduling by the first serving node and the second serving node due to wireless-node scheduling collision between the first serving node and the second serving node that occurs after the second serving node acts as an SN of the wireless node.

Optionally, the second centralized unit sends, to the first centralized unit by using RRC signaling with addition feedback information, resource configuration information of the second serving node DU usable for scheduling an MT of the wireless node, and the first centralized unit reconfigures, based on the information, resource configuration information of the first serving node DU usable for scheduling the MT of the wireless node, so as to reduce or avoid wireless-node scheduling collision between the first serving node and the second serving node.

Further, the first centralized unit sends an addition feedback of the second serving node DU to the first serving node, and then the first serving node sends the addition feedback of the second serving node DU to the wireless node. Finally, the wireless node feeds back reconfiguration completion information to the second centralized unit after executing a configuration message carried in the addition feedback of the second serving node DU.

After resource allocation coordination is performed between the first centralized unit and the second centralized unit, the first centralized unit and the second centralized unit may use DU resource allocation signaling to respectively configure the first serving node DU and the second serving node DU for scheduling the wireless node. For example, in the IAB network, a resource of a DU at each hop may be semi-statically allocated by a CU, and the DU schedules a sub-IAB-MT based on the allocated resource. The resource configuration is jointly determined based on a time division duplexing (TDD) configuration and a resource type indication.

The TDD configuration indicates fixed uplink slots and orthogonal frequency division multiplexing (OFDM) symbols, flexible uplink and downlink (flexible) slots and OFDM symbols, and fixed downlink slots and OFDM symbols.

The resource type indicates an availability attribute of the resource, where the availability attribute includes hard, not available (NA), and soft.

Hard is a DU resource indicated as hard by a DU, and the DU is able to freely use the resource based on a link direction (connection direction) in the TDD configuration. Soft is a DU resource indicated as soft by the DU, and the DU is able to freely use the resource based on a link direction in the TDD configuration in a case of determining that its parent IAB-DU does not use the resource.

In addition, a resource may be dynamically shared between a previous hop and a next hop of an IAB node. For a soft resource of an IAB-DU, the IAB node determines to allow its IAB-DU to schedule the soft resource for transmission of the next hop under the premise that reception by its IAB-MT is not affected. According to the current 3GPP protocol, the parent IAB-DU may indicate to a child IAB node by using PDCCH whether a soft resource of the child node IAB-DU is usable. Alternatively, an IAB node may determine itself to schedule a soft resource for data reception and transmission of the next hop under the premise that reception by its IAB-MT is not affected during scheduling of the soft resource.

It should be noted that resource configuration may alternatively include allocated DU frequency-domain resources. Herein, only the TDD configuration is used as an example.

Optionally, if resources are not well coordinated or not coordinated between the first centralized unit and the second centralized unit, and the MT of the wireless node detects collision between transmission resources scheduled by the first serving node DU and the second serving node DU, collision information may be reported to the first centralized unit, the second centralized unit, the first serving node, or the second serving node. The first centralized unit, the second centralized unit, the first serving node, or the second serving node determines how to avoid the collision.

Figure 9:
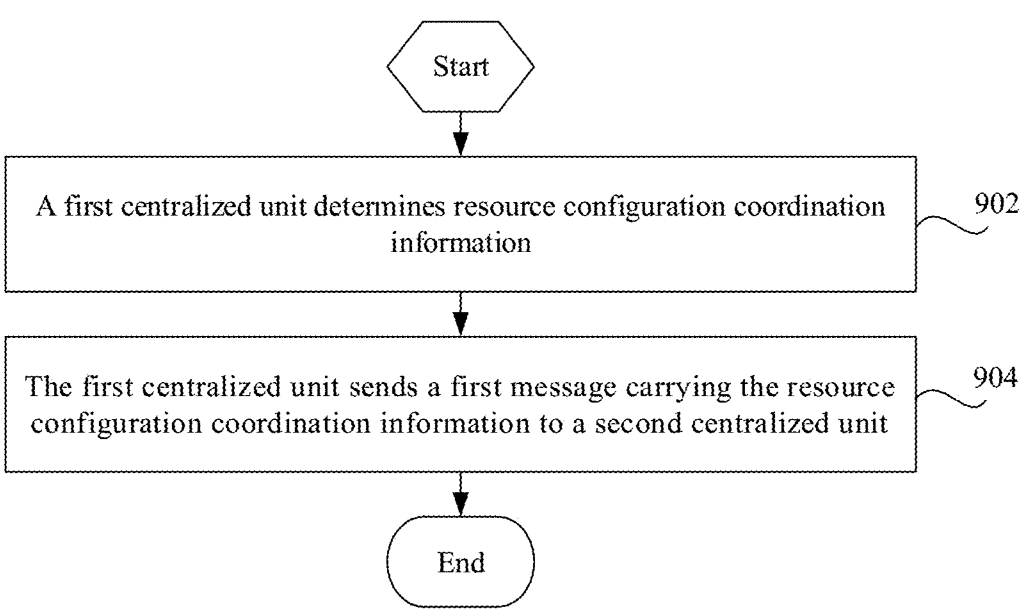
FIG. 9 is a first flowchart of an information transmission method according to an embodiment of this application.

FIG. 9 is a first flowchart of an information transmission method according to an embodiment of this application. The information transmission method may include the following steps.

Step 902: A first centralized unit determines resource configuration coordination information.

Step 904: The first centralized unit sends a first message carrying the resource configuration coordination information to a second centralized unit.

In this embodiment, the first centralized unit determines the resource configuration coordination information for a first serving node DU of a wireless node and a second serving node DU of the wireless node, and further sends the resource configuration coordination information to the second centralized unit, so that the second centralized unit configures, based on the resource configuration coordination information, the resource for the second serving node added for the wireless node. This reduces or avoids a probability that the wireless node cannot correspondingly execute scheduling by the first serving node and the second serving node due to wireless-node scheduling collision between the first serving node and the second serving node that occurs after the second serving node acts as an SN of the wireless node, thereby improving wireless-node scheduling efficiency.

In some embodiments of this application, the wireless node includes an IAB node or UE. The IAB node includes an MT and a DU. To be specific, the method in this embodiment of this application is applicable to resource allocation coordination between two parent IAB-DUs when the two parent IAB-DUs belong to different CUs in a case of intra-frequency DC or intra-band inter-frequency DC in the IAB network, and the method is also applicable to dual connectivity for NR/LTE UEs under the same condition. In this embodiment of this application, resource allocation collision and scheduling collision between an MCG link and an SCG link of the UE or the MT can be reduced or avoided.

In some embodiments of this application, the resource configuration coordination information includes at least one of the following: a time-frequency resource for a distributed unit of the wireless node; time-frequency resource of the first serving node for scheduling the wireless node; a required minimum time-frequency resource of the first serving node for scheduling the wireless node; a time-frequency resource pool for the second serving node for scheduling the wireless node; a multiplexing scheduling mode between a first-serving-node connection link and a second-serving-node connection link that are for scheduling the wireless node; a multiplexing mode between a link from a wireless node to the first serving node and a link from the wireless node to the second serving node; link direction corresponding to a time-frequency resource; and a type indication of the time-frequency resource, where type information of the time-frequency resource includes hard, soft, and not available.

In this embodiment, the resource configuration coordination information of the first serving node DU and the second serving node DU sent by the first centralized unit to the second centralized unit may include one or more of the following:

(1) time-domain resource and frequency-domain resource of a DU of an IAB node;

(2) time-domain resource and frequency-domain resource of the first serving node for scheduling an MT of the IAB node or UE;

(3) required minimum time-domain resource and frequency-domain resource of the first serving node DU for scheduling the MT of the IAB node or the UE;

(4) time-domain resource pool and frequency-domain resource pool that are available for allocation by the second centralized unit for the second serving node DU and that are available for scheduling the MT of the IAB node or the UE;

(5) multiplexing scheduling mode or duplexing mode between the MN link and the SN link for scheduling the MT of the IAB node or the UE, where the multiplexing scheduling mode includes time division multiplexing, frequency division multiplexing, and the like, and the duplexing mode supports half-duplex, full-duplex, and the like;

(6) link direction corresponding to a time-domain resource and frequency-domain resource, where the link direction of the time-domain resource and the frequency-domain resource may be indicated based on slot or OFDM symbol; and (7) a type indication of the time-frequency resource, where type information of the time-frequency resource includes hard, soft, and not available.

For example, after the first centralized unit sends a time-frequency resource of the DU of the IAB node to the second centralized unit, the second centralized unit can determine a to-be-allocated resource not colliding with the resource of the DU of the IAB node. After the first centralized unit sends, to the second centralized unit, the time-frequency resource of the first serving node DU for scheduling the MT of the IAB node or the UE, the second centralized unit can determine a to-be-allocated resource of the second serving node DU not colliding with the resource of the first serving node DU. After the first centralized unit sends, to the second centralized unit, a time-frequency resource pool available for allocation by the second centralized unit for the second serving node DU and available for scheduling the MT of the IAB node or the UE, the second centralized unit may determine a DU resource range that can be allocated to the second serving node for scheduling the MT of the IAB node or the UE.

The foregoing information is sent to the second centralized unit, so that the second centralized unit can perform resource allocation for the second serving node based on the information, so as to reduce or avoid collision in scheduling the MT of the IAB node or the UE by the first serving node and the second serving node.

Figure 10:
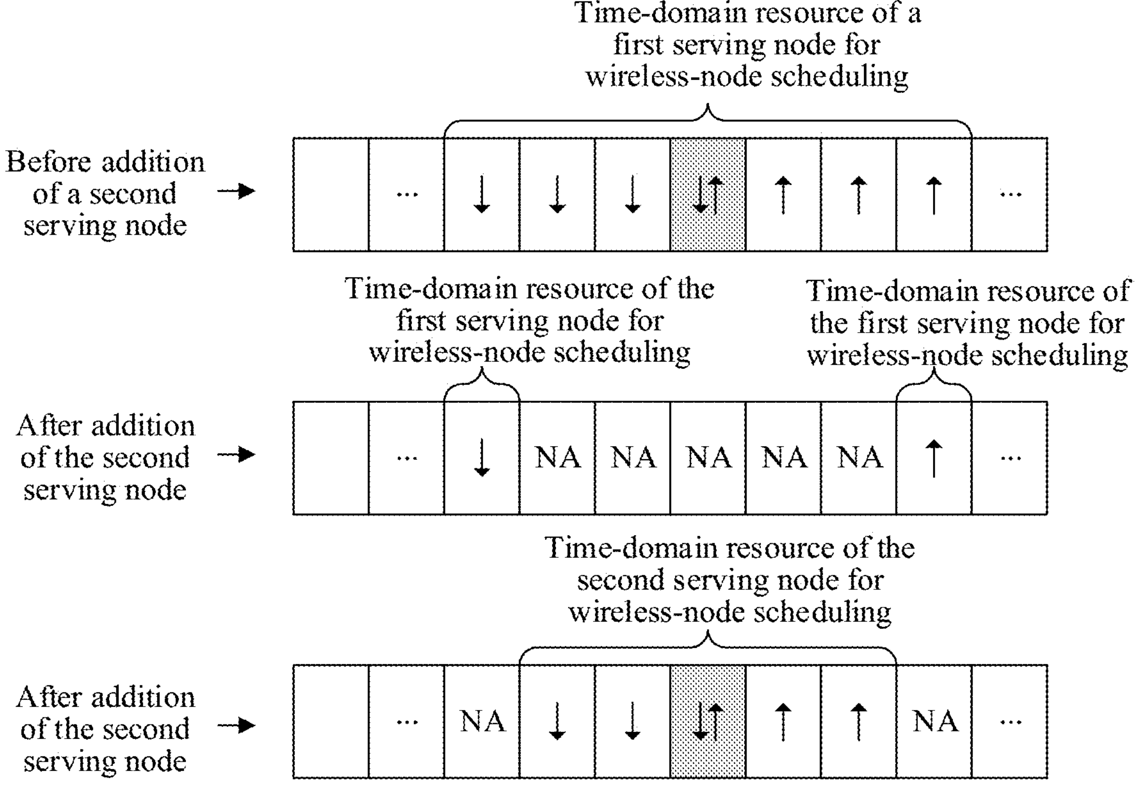
FIG. 10 is a schematic diagram of time division allocation for resource configuration according to an embodiment of this application.

FIG. 10 is a schematic diagram of time division allocation for resource configuration according to an embodiment of this application. After a second serving node is added, part of time-domain resources all configured to a first serving node for wireless-node scheduling before addition of the second serving node are allocated and configured to the second serving node, so that time-domain resources of the first serving node and the second serving node for wireless-node scheduling are different, thereby reducing or avoiding time-domain resource collision that occurs during scheduling of the wireless node.

Figure 11:
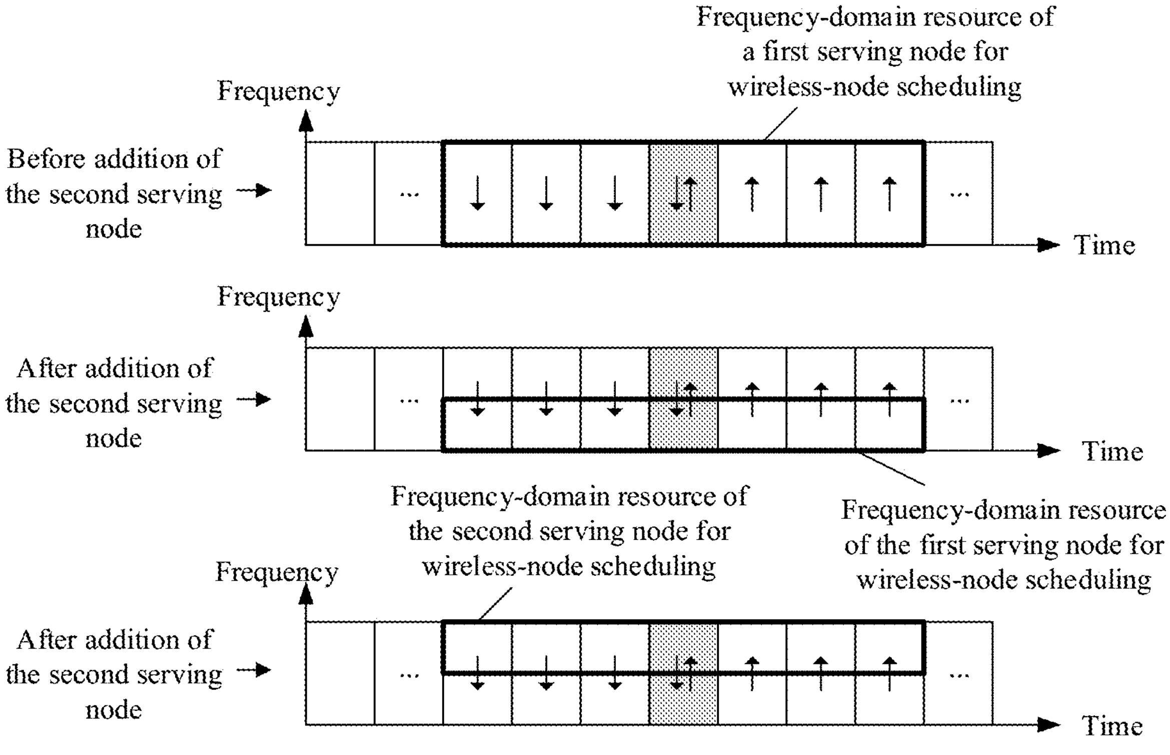
FIG. 11 is a schematic diagram of frequency division allocation for resource configuration according to an embodiment of this application.

FIG. 11 is a schematic diagram of frequency division allocation for resource configuration according to an embodiment of this application. After a second serving node is added, part of frequency-domain resources all configured to a first serving node for wireless-node scheduling before addition of the second serving node are allocated and configured to the second serving node, so that frequency-domain resources of the first serving node and the second serving node for wireless-node scheduling are different, thereby reducing or avoiding frequency-domain resource collision that occurs during scheduling of the wireless node.

In FIGS. 10 and 11, fixed uplink resources are denoted by "↑", fixed downlink resources are denoted by "↓,", and downlink-to-uplink slot resources are denoted by "↓↑".

In some embodiments of this application, the sending, by the first centralized unit, a first message carrying the resource configuration coordination information to a second centralized unit includes: in a case that the second serving node of the wireless node needs to be added, sending, by the first centralized unit, the first message carrying the resource configuration coordination information to the second centralized unit.

In this embodiment, if the first centralized unit determines to add the second serving node for a wireless node after receiving a measurement report of surrounding wireless nodes from the wireless node (the measurement report may include signal quality from the second serving node to the wireless node), the first centralized unit sends the resource configuration coordination information when sending an addition request to the second centralized unit, that is, the first message may be an addition request sent by the first centralized unit to the second centralized unit, for indicating the second centralized unit to add the second serving node. According to this embodiment of this application, the second centralized unit is able to perform resource coordination configuration for the second serving node during addition of the second serving node, thereby reducing or avoiding resource collision between the second serving node and the first serving node during scheduling of the wireless node.

In some embodiments of this application, after step 904, the information transmission method further includes: receiving, by the first centralized unit, a second message sent by the second centralized unit; obtaining, by the first centralized unit, resource configuration information of a second serving node of a wireless node carried in the second message; and adjusting, by the first centralized unit, resource configuration information of a first serving node of the wireless node according to the resource configuration information of the second serving node.

In this embodiment, after configuring, based on the resource configuration coordination information, a resource for the second serving node added for the wireless node, the second centralized unit feeds back the resource configuration information of the second serving node to the first centralized unit. The first centralized unit may further adjust the resource configuration information of the first serving node based on the resource configuration information of the second serving node. In this way, it can be further ensured that the wireless-node scheduling resource of the first serving node does not collide with the wireless-node scheduling resource of the second serving node, thereby improving a wireless-node scheduling success rate.

In some embodiments of this application, before step 902 or after step 904, the information transmission method further includes: receiving, by the first centralized unit, a third message sent by the wireless node; obtaining, by the first centralized unit, resource collision information carried in the third message; and adjusting, by the first centralized unit based on the resource collision information, wireless-node scheduling or determining the resource configuration coordination information.

In this embodiment, the wireless node may assist in coordinating wireless-node scheduling resources between the first serving node and the second serving node. Specifically, if the wireless node detects collision of transmission resources scheduled by the first serving node and the second serving node, the wireless node may report the resource collision information to the first centralized unit, and the first centralized unit further determines how to avoid the collision.

It should be noted that the process of assisting, by the wireless node, in coordinating wireless-node scheduling resources between the first serving node and the second serving node may be performed before or after the first centralized unit sends the resource configuration coordination information to the second centralized unit, that is, if the resources are not coordinated or not well coordinated between the first centralized unit and the second centralized unit, the wireless node assists in coordinating wireless-node scheduling resources between the first serving node and the second serving node.

Specifically, if the first centralized unit obtains the resource collision information before step 902, the first centralized unit determines the resource configuration coordination information based on the resource collision information; or if the first centralized unit obtains the resource collision information after step 904, the first centralized unit adjusts wireless-node scheduling or re-determines the resource configuration coordination information based on the resource collision information. In the foregoing manner, a probability of wireless-node scheduling collision can be reduced.

In some embodiments of this application, the resource collision information includes resource collision type information and at least one of a system frame number, a slot index, or a symbol index. The resource collision type information includes at least one of the following:

(1) time-domain overlapping or frequency-domain overlapping between a first-serving-node link (which is an MCG link) and a second-serving-node link (which is an SCG link), for transmission of a physical downlink shared channel (PDSCH), a physical downlink control channel (PDCCH), or a channel state information reference signal (CSI-RS);

(2) time-domain overlapping or frequency-domain overlapping between the first-serving-node link and the second-serving-node link, for transmission of a physical uplink shared channel (PUSCH), an SRS (Sounding Reference Signal, channel sounding reference signal), a physical uplink control channel (PUCCH), or a PRACH (Physical Random Access Channel, physical layer random access channel);

(3) time-domain overlapping or frequency-domain overlapping between transmission of at least one of a PUSCH, an SRS, a PUCCH, and a PRACH on the first-serving-node link and transmission of at least one of a PDSCH, a PDCCH, and a CSI-RS on the second-serving-node link;

(4) time-domain overlapping or frequency-domain overlapping between transmission of at least one of a PUSCH, an SRS, a PUCCH, and a PRACH on the second-serving-node link and transmission of at least one of a PDSCH, a PDCCH, and a CSI-RS on the first-serving-node link; and (5) time-domain overlapping or frequency-domain overlapping of downlink control information (DCI) search space between the first-serving-node link and the second-serving-node link.

In this embodiment, when the collision behavior is detected, it indicates that the first serving node collides with the second serving node in scheduling of the wireless node. Then, the wireless node may report collision type information and one or more of a system frame number, a slot index, and a symbol index involved in collision to the first centralized unit, and the first centralized unit determines how to avoid the collision, thereby reducing a probability of subsequent wireless-node scheduling collision.

Figure 12:
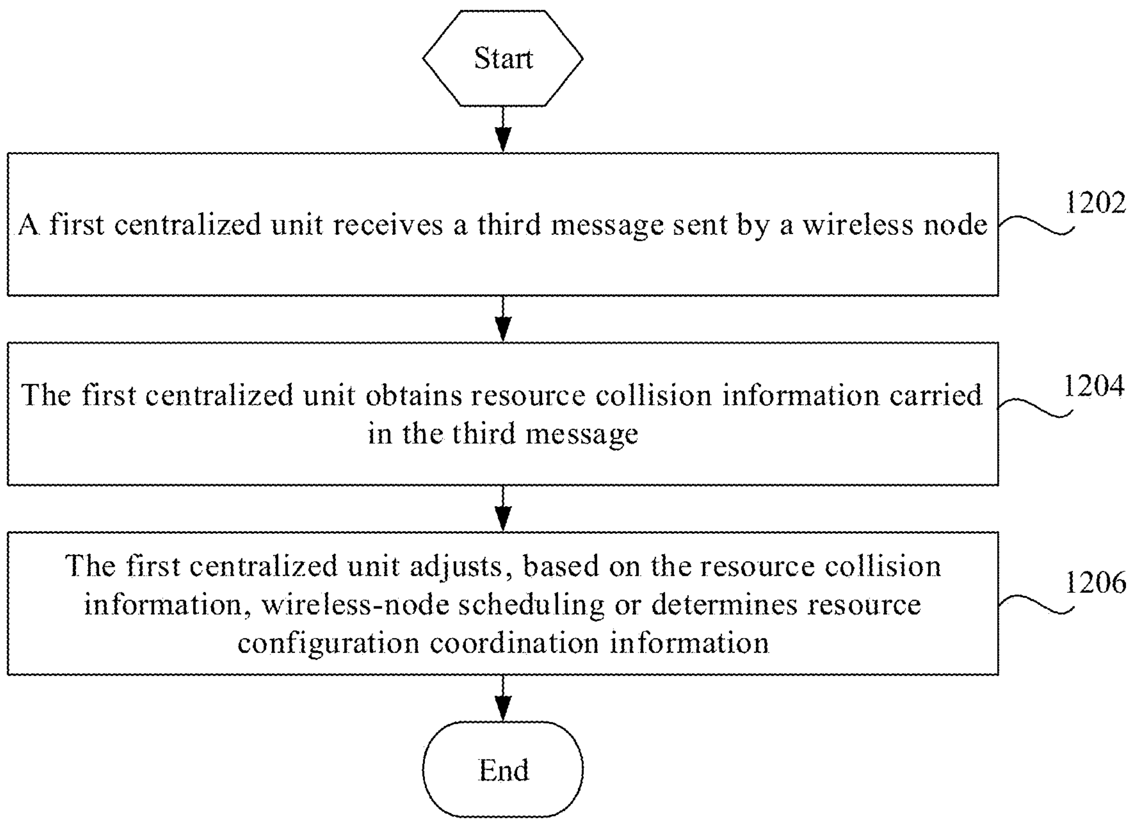
FIG. 12 is a second flowchart of an information transmission method according to an embodiment of this application.

In some embodiments of this application, FIG. 12 is a second flowchart of an information transmission method according to an embodiment of this application. The information transmission method includes the following steps.

Step 1202: A first centralized unit receives a third message sent by a wireless node.

Step 1204: The first centralized unit obtains resource collision information carried in the third message.

Step 1206: The first centralized unit adjusts, based on the resource collision information, wireless-node scheduling or determines resource configuration coordination information.

The resource collision information includes resource collision type information and at least one of a system frame number, a slot index, or a symbol index. The resource collision type information is described above, and details are not repeated herein.

In this embodiment, the technical solution in which the first centralized unit adjusts wireless-node scheduling or determines the resource configuration coordination information based on the resource collision information sent by the wireless node may be implemented independent of the technical solution in which the first centralized unit determines the resource configuration coordination information and sends the resource configuration coordination information to the second centralized unit. In other words, wireless-node scheduling resources between the first serving node and the second serving node are coordinated only by the wireless node. If the wireless node detects collision of transmission resources scheduled by the first serving node and the second serving node, the wireless node may report the resource collision information to the first centralized unit, and the first centralized unit further determines how to avoid the collision.

Specifically, the first centralized unit adjusts wireless-node scheduling or determines the resource configuration coordination information based on the resource collision information. In this manner, a probability of wireless-node scheduling collision can be reduced.

Figure 13:
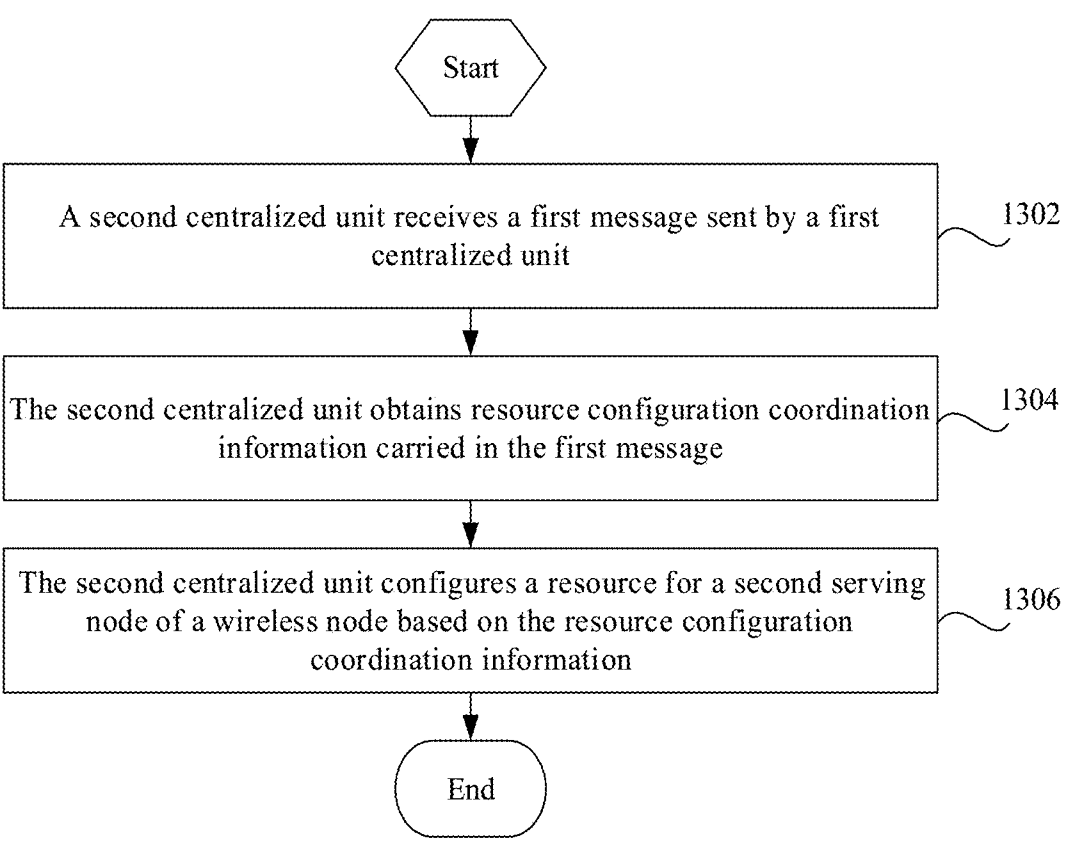
FIG. 13 is a third flowchart of an information transmission method according to an embodiment of this application.

FIG. 13 is a third flowchart of an information transmission method according to an embodiment of this application. The information transmission method may include the following steps.

Step 1302: A second centralized unit receives a first message sent by a first centralized unit.

Step 1304: The second centralized unit obtains resource configuration coordination information carried in the first message.

Step 1306: The second centralized unit configures a resource for a second serving node of a wireless node based on the resource configuration coordination information.

In this embodiment, the second centralized unit receives the resource configuration coordination information sent by the first centralized unit, and further allocates, based on the resource configuration coordination information, a resource to the second serving node added for the wireless node. This reduces or avoids a probability that the wireless node cannot correspondingly execute scheduling by the first serving node and the second serving node due to wireless-node scheduling collision between the first serving node and the second serving node that occurs after the second serving node acts as an SN of the wireless node, thereby improving wireless-node scheduling efficiency.

In some embodiments of this application, the wireless node includes an IAB node or UE. The IAB node includes an MT and a DU. To be specific, the method in this embodiment of this application is applicable to resource allocation coordination between two parent IAB-DUs when the two parent IAB-DUs belong to different CUs in a case of intra-frequency DC or intra-band inter-frequency DC in the IAB network, and the method is also applicable to dual connectivity for NR/LTE UEs under the same condition. In this embodiment of this application, resource allocation collision and scheduling collision between an MCG link and an SCG link of the UE or the MT can be reduced or avoided.

In some embodiments of this application, the resource configuration coordination information includes at least one of the following: a time-frequency resource for a distributed unit of the wireless node; time-frequency resource of the first serving node for scheduling the wireless node; a required minimum time-frequency resource of the first serving node for scheduling the wireless node; a time-frequency resource pool for the second serving node for scheduling the wireless node; a multiplexing scheduling mode between a first-serving-node connection link and a second-serving-node connection link that are for scheduling the wireless node; a multiplexing mode between a link from a wireless node to the first serving node and a link from the wireless node to the second serving node; link direction corresponding to a time-frequency resource; and a type indication of the time-frequency resource, where type information of the time-frequency resource includes hard, soft, and not available.

In this embodiment, the resource configuration coordination information of the first serving node DU and the second serving node DU sent by the first centralized unit to the second centralized unit may include one or more of the following:

(1) time-domain resource and frequency-domain resource of a DU of an IAB node;

(2) time-domain resource and frequency-domain resource of a first serving node for scheduling an MT of the IAB node or UE;

(3) required minimum time-domain resource and frequency-domain resource of the first serving node DU for scheduling the MT of the IAB node or the UE;

(4) time-domain resource pool and frequency-domain resource pool that are available for allocation by the second centralized unit for the second serving node DU and that are available for scheduling the MT of the IAB node or the UE;

(5) multiplexing scheduling mode or duplexing mode between the MN link and the SN link for scheduling the MT of the IAB node or the UE, where the multiplexing scheduling mode includes time division multiplexing, frequency division multiplexing, and the like, and the duplexing mode supports half-duplex, full-duplex, and the like;

(6) link direction corresponding to a time-domain resource and frequency-domain resource, where the link direction of the time-domain resource and the frequency-domain resource may be indicated based on slot or OFDM symbol; and (7) a type indication of the time-frequency resource, where type information of the time-frequency resource includes hard, soft, and not available.

For example, after the first centralized unit sends a time-frequency resource of the DU of the IAB node to the second centralized unit, the second centralized unit can determine a to-be-allocated resource not colliding with the resource of the DU of the IAB node. After the first centralized unit sends, to the second centralized unit, the time-frequency resource of the first serving node DU for scheduling the MT of the IAB node or the UE, the second centralized unit can determine a to-be-allocated resource of the second serving node DU not colliding with the resource of the first serving node DU. After the first centralized unit sends, to the second centralized unit, a time-domain resource pool and frequency-domain resource pool that are available for allocation by the second centralized unit for the second serving node DU and that are available for scheduling the MT of the IAB node or the UE, the second centralized unit may determine a DU resource range that can be allocated to the second serving node for scheduling the MT of the IAB node or the UE.

With the foregoing information, the second centralized unit can perform resource allocation for the second serving node based on the information, so as to reduce or avoid collision in scheduling the MT of the IAB node or the UE between the first serving node and the second serving node.

In some embodiments of this application, if the first centralized unit determines to add the second serving node for a wireless node after receiving a measurement report of surrounding wireless nodes from the wireless node (the measurement report may include signal quality from the second serving node to the wireless node), the first centralized unit sends the resource configuration coordination information when sending an addition request to the second centralized unit, that is, the first message may be an addition request sent by the first centralized unit to the second centralized unit, for indicating the second centralized unit to add the second serving node. According to this embodiment of this application, the second centralized unit is able to perform resource coordination configuration for the second serving node during addition of the second serving node, thereby reducing or avoiding resource collision between the second serving node and the first serving node during scheduling of the wireless node.

In some embodiments of this application, after step 1306, the information transmission method further includes: sending, by the second centralized unit, a second message carrying resource configuration information of the second serving node to the first centralized unit.

In this embodiment, after configuring, based on the resource configuration coordination information, the resource for the second serving node added for the wireless node, the second centralized unit feeds back the resource configuration information of the second serving node to the first centralized unit, so that the first centralized unit can further adjust the resource configuration information of the first serving node based on the resource configuration information of the second serving node. In this way, it can be further ensured that the wireless-node scheduling resource of the first serving node does not collide with the wireless-node scheduling resource of the second serving node, thereby improving a wireless-node scheduling success rate.

In some embodiments of this application, before step 1302 or after step 1304, the information transmission method further includes: receiving, by the second centralized unit, a fourth message sent by the wireless node; obtaining, by the second centralized unit, resource collision information carried in the fourth message; and adjusting, by the second centralized unit based on the resource collision information, wireless-node scheduling or configuring a resource for the second serving node.

In this embodiment, the wireless node may assist in coordinating wireless-node scheduling resources between the first serving node and the second serving node. Specifically, if the wireless node detects collision of transmission resources scheduled by the first serving node and the second serving node, the wireless node may report the resource collision information to the second centralized unit, and the second centralized unit further determines how to avoid the collision.

It should be noted that the process of assisting, by the wireless node, in coordinating wireless-node scheduling resources between the first serving node and the second serving node may be performed before or after the second centralized unit receives the resource configuration coordination information sent by the first centralized unit, that is, if the resources are not coordinated or not well coordinated between the first centralized unit and the second centralized unit, the wireless node assists in coordinating wireless-node scheduling resources between the first serving node and the second serving node.

Specifically, if the second centralized unit obtains the resource collision information before step 1302, the second centralized unit adjusts, based on the resource collision information, wireless-node scheduling or configures a resource for the second serving node, and after the resource configuration coordination information sent by the first centralized unit is received, the second centralized unit further adjusts, based on the resource configuration coordination information, wireless-node scheduling or re-allocates resources to the second serving node of the wireless node. If the second centralized unit obtains the resource collision information after step 1304, the second centralized unit adjusts, based on the resource collision information, wireless-node scheduling or re-configures a resource for the second serving node. In the foregoing manner, a probability of wireless-node scheduling collision can be reduced.

In some embodiments of this application, the resource collision information includes resource collision type information and at least one of a system frame number, a slot index, or a symbol index. The resource collision type information includes at least one of the following:

(1) time-domain overlapping or frequency-domain overlapping between a first-serving-node link and a second-serving-node link, for transmission of a physical downlink shared channel (PDSCH), a physical downlink control channel (PDCCH), or a channel state information reference signal (CSI-RS);

(2) time-domain overlapping or frequency-domain overlapping between the first-serving-node link and the second-serving-node link, for transmission of a physical uplink shared channel (PUSCH), an SRS (Sounding Reference Signal, channel sounding reference signal), a physical uplink control channel (PUCCH), or a PRACH (Physical Random Access Channel, physical layer random access channel);

(3) time-domain overlapping or frequency-domain overlapping between transmission of at least one of a PUSCH, an SRS, a PUCCH, and a PRACH on the first-serving-node link and transmission of at least one of a PDSCH, a PDCCH, and a CSI-RS on the second-serving-node link;

(4) time-domain overlapping or frequency-domain overlapping between transmission of at least one of a PUSCH, an SRS, a PUCCH, and a PRACH on the second-serving-node link and transmission of at least one of a PDSCH, a PDCCH, and a CSI-RS on the first-serving-node link; and (5) time-domain overlapping or frequency-domain overlapping of downlink control information (DCI) search space between the first-serving-node link and the second-serving-node link.

In this embodiment, when the collision behavior is detected, it indicates that the first serving node collides with the second serving node in scheduling of the wireless node. Then, the wireless node may report collision type information and one or more of a system frame number, a slot index, and a symbol index involved in collision to the first centralized unit. The second centralized unit determines how to avoid the collision, thereby reducing a probability of subsequent wireless-node scheduling collision.

Figure 14:
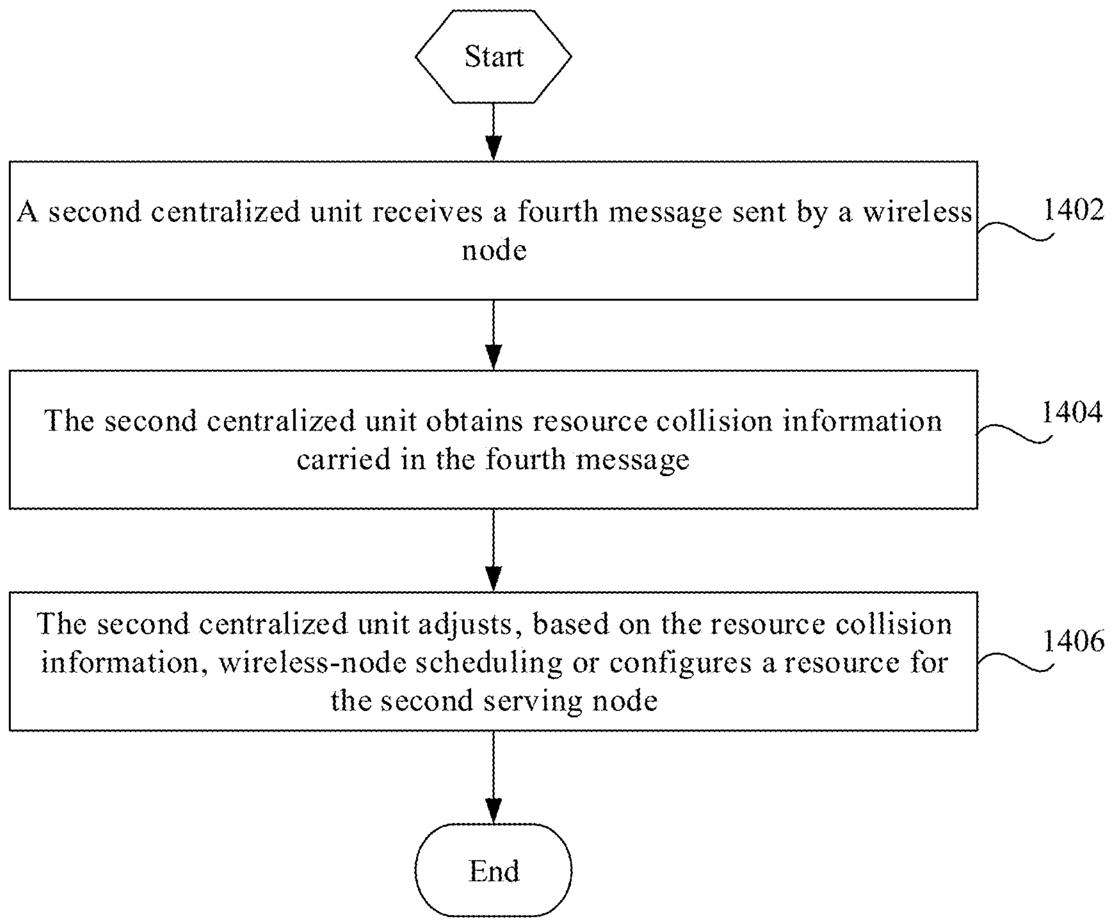
FIG. 14 is a fourth flowchart of an information transmission method according to an embodiment of this application.

In some embodiments of this application, FIG. 14 is a fourth flowchart of an information transmission method according to an embodiment of this application. The information transmission method includes the following steps.

Step 1402: A second centralized unit receives a fourth message sent by a wireless node.

Step 1404: The second centralized unit obtains resource collision information carried in the fourth message.

Step 1406: The second centralized unit adjusts, based on the resource collision information, wireless-node scheduling or configures a resource for the second serving node.

The resource collision information includes resource collision type information and at least one of a system frame number, a slot index, or a symbol index. The resource collision type information is described above, and details are not repeated herein.

In this embodiment, the technical solution in which the second centralized unit adjusts, based on the resource collision information sent by the wireless node, wireless-node scheduling or configures the resource for the second serving node may be implemented independent of the technical solution in which the second centralized unit configures the resource for the second serving node based on the resource configuration coordination information sent by the first centralized unit. In other words, wireless-node scheduling resources between the first serving node and the second serving node are coordinated only by the wireless node. If the wireless node detects collision of transmission resources scheduled by the first serving node and the second serving node, the wireless node may report the resource collision information to the second centralized unit, and the second centralized unit further determines how to avoid the collision.

Specifically, the second centralized unit adjusts, based on the resource collision information, wireless-node scheduling or configures the resource for the second serving node. In this manner, a probability of wireless-node scheduling collision can be reduced.

Figure 15:
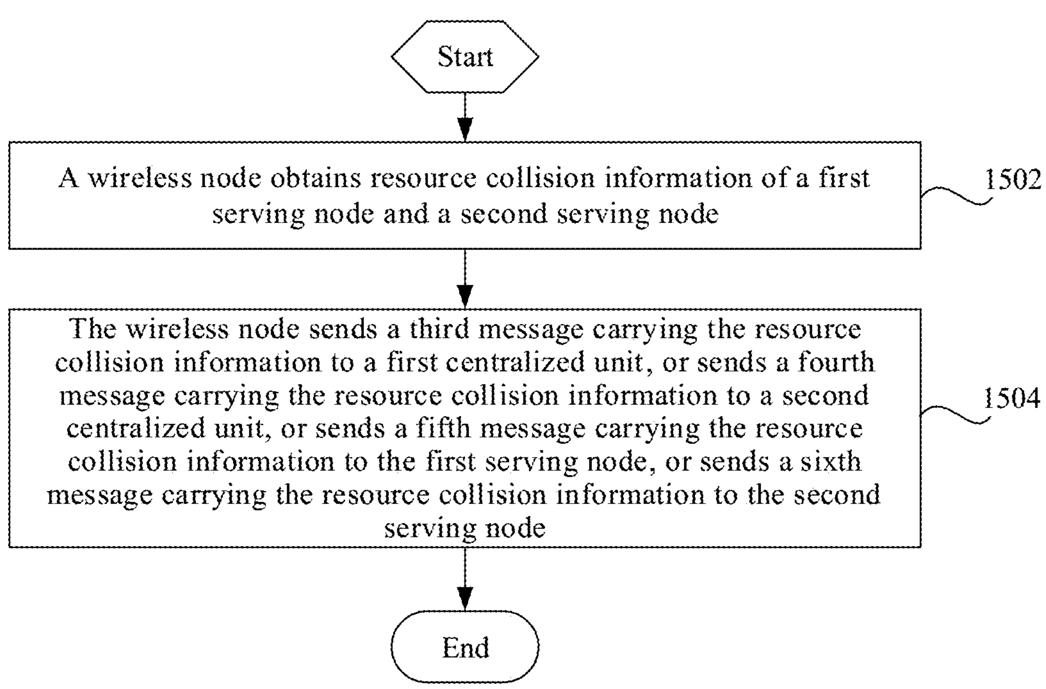
FIG. 15 is a fifth flowchart of an information transmission method according to an embodiment of this application.

FIG. 15 is a fifth flowchart of an information transmission method according to an embodiment of this application. The information transmission method may include the following steps.

Step 1502: A wireless node obtains resource collision information between a first serving node and a second serving node.

Step 1504: The wireless node sends a third message carrying the resource collision information to a first centralized unit, or sends a fourth message carrying the resource collision information to a second centralized unit, or sends a fifth message carrying the resource collision information to the first serving node, or sends a sixth message carrying the resource collision information to the second serving node.

In this embodiment, the wireless node may assist in coordinating wireless-node scheduling resources between the first serving node and the second serving node. Specifically, if the wireless node detects collision of transmission resources scheduled by the first serving node and the second serving node, the wireless node may report the resource collision information to the first serving node, the second serving node, the first centralized unit, or the second centralized unit, and further the first serving node, the second serving node, the first centralized unit, or the second centralized unit determines how to avoid the collision.

In one embodiment, after receiving the resource collision information, the first centralized unit may control the first serving node to adjust wireless-node scheduling or re-determines the resource configuration coordination information. After receiving the resource collision information, the first serving node may adjust scheduling of the wireless node, thereby reducing a probability of subsequent wireless-node scheduling collision.

After receiving the resource collision information, the second centralized unit may control the second serving node to adjust scheduling of the wireless node or may configure the resource for the second serving node. After receiving the resource collision information, the second serving node may adjust scheduling of the wireless node, thereby reducing a probability of subsequent wireless-node scheduling collision.

In some embodiments of this application, the wireless node includes an IAB node or UE. The IAB node includes an MT and a DU. To be specific, the method in this embodiment of this application is applicable to resource allocation coordination between two parent IAB-DUs when the two parent IAB-DUs belong to different CUs in a case of intra-frequency DC or intra-band inter-frequency DC in the IAB network, and the method is also applicable to dual connectivity for NR/LTE UEs under the same condition. In this embodiment of this application, resource allocation collision and scheduling collision between an MCG link and an SCG link of the UE or the MT can be reduced or avoided.

In some embodiments of this application, the resource collision information includes resource collision type information and at least one of a system frame number, a slot index, or a symbol index. The resource collision type information includes at least one of the following:

(1) time-domain overlapping or frequency-domain overlapping between a first-serving-node link and a second-serving-node link, for transmission of a physical downlink shared channel (PDSCH), a physical downlink control channel (PDCCH), or a channel state information reference signal (CSI-RS);

(2) time-domain overlapping or frequency-domain overlapping between the first-serving-node link and the second-serving-node link, for transmission of a physical uplink shared channel (PUSCH), an SRS (Sounding Reference Signal, channel sounding reference signal), a physical uplink control channel (PUCCH), or a PRACH (Physical Random Access Channel, physical layer random access channel);

(3) time-domain overlapping or frequency-domain overlapping between transmission of at least one of a PUSCH, an SRS, a PUCCH, and a PRACH on the first-serving-node link and transmission of at least one of a PDSCH, a PDCCH, and a CSI-RS on the second-serving-node link;

(4) time-domain overlapping or frequency-domain overlapping between transmission of at least one of a PUSCH, an SRS, a PUCCH, and a PRACH on the second-serving-node link and transmission of at least one of a PDSCH, a PDCCH, and a CSI-RS on the first-serving-node link; and (5) time-domain overlapping or frequency-domain overlapping of downlink control information (DCI) search space between the first-serving-node link and the second-serving-node link.

In this embodiment, when the collision behavior is detected, it indicates that the first serving node collides with the second serving node in scheduling of the wireless node. Then, the wireless node may report collision type information and one or more of a system frame number, a slot index, and a symbol index involved in collision to the first serving node, the second serving node, the first centralized unit, or the second centralized unit; and then the first serving node, the second serving node, the first centralized unit, or the second centralized unit determines how to avoid the collision, thereby reducing a probability of subsequent wireless-node scheduling collision.

Figure 16:
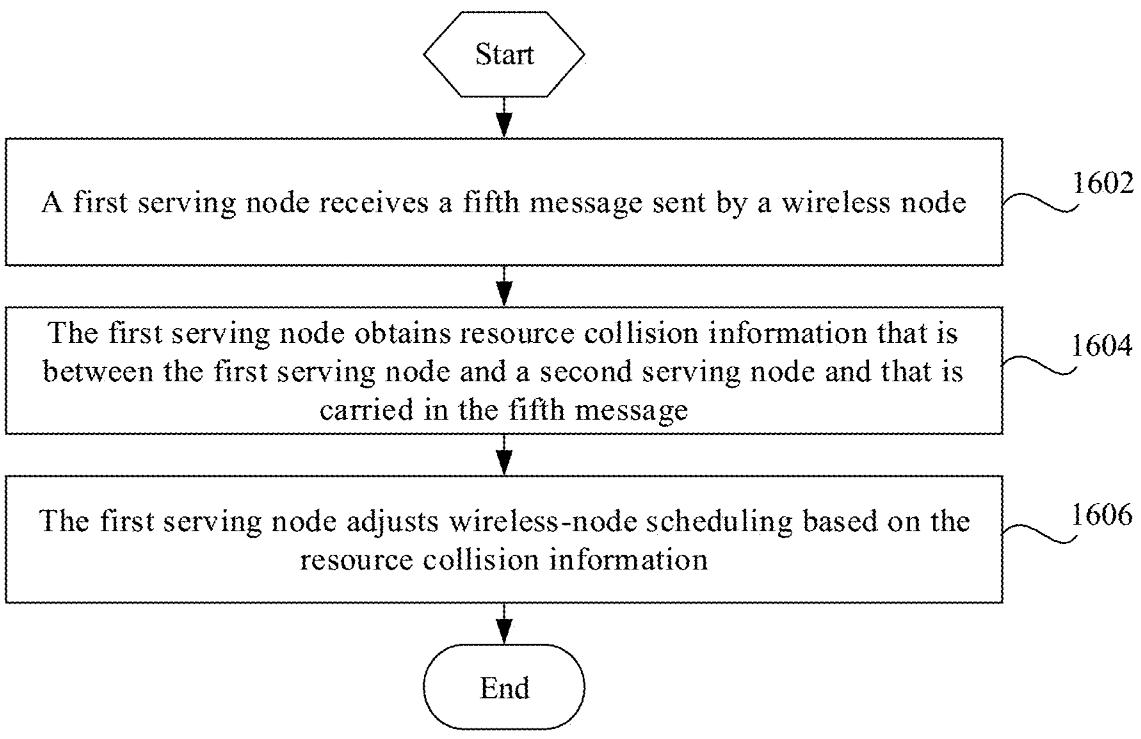
FIG. 16 is a sixth flowchart of an information transmission method according to an embodiment of this application.

FIG. 16 is a sixth flowchart of an information transmission method according to an embodiment of this application. The information transmission method may include the following steps.

Step 1602: A first serving node receives a fifth message sent by a wireless node.

Step 1604: The first serving node obtains resource collision information that is between the first serving node and a second serving node and that is carried in the fifth message.

Step 1606: The first serving node adjusts wireless-node scheduling based on the resource collision information.

In this embodiment, the wireless node may assist in coordinating wireless-node scheduling resources between the first serving node and the second serving node. Specifically, if the wireless node detects collision of transmission resources scheduled by the first serving node and the second serving node, the wireless node may report the resource collision information to the first serving node, and after receiving the resource collision information, the first serving node determines how to avoid the collision.

In one embodiment, the first serving node may adjust scheduling of the wireless node after receiving the resource collision information, thereby reducing a probability of subsequent wireless-node scheduling collision.

In some embodiments of this application, the wireless node includes an IAB node or UE. The IAB node includes an MT and a DU. To be specific, the method in this embodiment of this application is applicable to resource allocation coordination between two parent IAB-DUs when the two parent IAB-DUs belong to different CUs in a case of intra-frequency DC or intra-band inter-frequency DC in the IAB network, and the method is also applicable to dual connectivity for NR/LTE UEs under the same condition. In this embodiment of this application, resource allocation collision and scheduling collision between an MCG link and an SCG link of the UE or the MT can be reduced or avoided.

In some embodiments of this application, the resource collision information includes resource collision type information and at least one of a system frame number, a slot index, or a symbol index. The resource collision type information includes at least one of the following:

(1) time-domain overlapping or frequency-domain overlapping between a first-serving-node link and a second-serving-node link, for transmission of a physical downlink shared channel (PDSCH), a physical downlink control channel (PDCCH), or a channel state information reference signal (CSI-RS);

(2) time-domain overlapping or frequency-domain overlapping between the first-serving-node link and the second-serving-node link, for transmission of a physical uplink shared channel (PUSCH), an SRS (Sounding Reference Signal, channel sounding reference signal), a physical uplink control channel (PUCCH), or a PRACH (Physical Random Access Channel, physical layer random access channel);

(3) time-domain overlapping or frequency-domain overlapping between transmission of at least one of a PUSCH, an SRS, a PUCCH, and a PRACH on the first-serving-node link and transmission of at least one of a PDSCH, a PDCCH, and a CSI-RS on the second-serving-node link;

(4) time-domain overlapping or frequency-domain overlapping between transmission of at least one of a PUSCH, an SRS, a PUCCH, and a PRACH on the second-serving-node link and transmission of at least one of a PDSCH, a PDCCH, and a CSI-RS on the first-serving-node link; and (5) time-domain overlapping or frequency-domain overlapping of downlink control information (DCI) search space between the first-serving-node link and the second-serving-node link.

In this embodiment, when the collision behavior is detected, it indicates that the first serving node collides with the second serving node in scheduling of the wireless node. Then, the wireless node may report collision type information and one or more of a system frame number, a slot index, and a symbol index involved in collision to the first serving node, and the first serving node determines how to avoid the collision, thereby reducing a probability of subsequent wireless-node scheduling collision.

Figure 17:
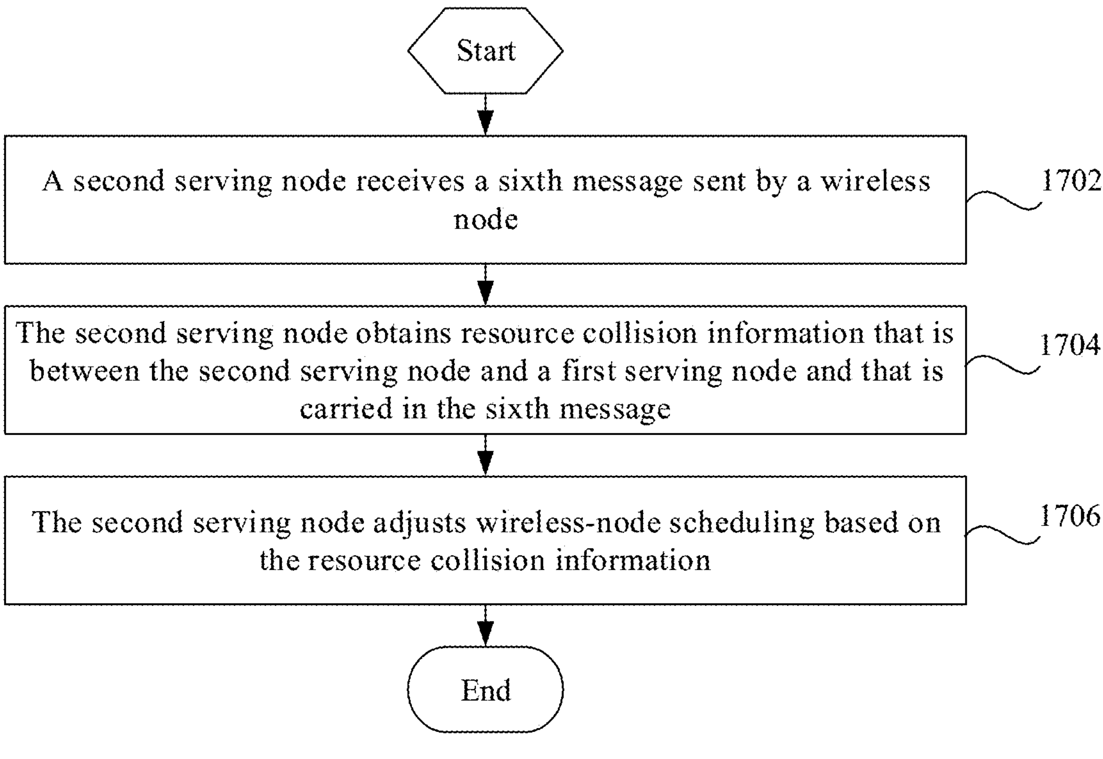
FIG. 17 is a seventh flowchart of an information transmission method according to an embodiment of this application.

FIG. 17 is a seventh flowchart of an information transmission method according to an embodiment of this application. The information transmission method may include the following steps.

Step 1702: A second serving node receives a sixth message sent by a wireless node.

Step 1704: The second serving node obtains resource collision information that is between the second serving node and a first serving node and that is carried in the sixth message.

Step 1706: The second serving node adjusts wireless-node scheduling based on the resource collision information.

In this embodiment, the wireless node may assist in coordinating wireless-node scheduling resources between the first serving node and the second serving node. Specifically, if the wireless node detects collision of transmission resources scheduled by the first serving node and the second serving node, the wireless node may report the resource collision information to the second serving node, and after receiving the resource collision information, the second serving node determines how to avoid the collision.

In one embodiment, the second serving node may adjust scheduling of the wireless node after receiving the resource collision information, thereby reducing a probability of subsequent wireless-node scheduling collision.

In some embodiments of this application, the wireless node includes an IAB node or UE. The IAB node includes an MT and a DU. To be specific, the method in this embodiment of this application is applicable to resource allocation coordination between two parent IAB-DUs when the two parent IAB-DUs belong to different CUs in a case of intra-frequency DC or intra-band inter-frequency DC in the IAB network, and the method is also applicable to dual connectivity for NR/LTE UEs under the same condition. In this embodiment of this application, resource allocation collision and scheduling collision between an MCG link and an SCG link of the UE or the MT can be reduced or avoided.

In some embodiments of this application, the resource collision information includes resource collision type information and at least one of a system frame number, a slot index, or a symbol index. The resource collision type information includes at least one of the following:

(1) time-domain overlapping or frequency-domain overlapping between a first-serving-node link and a second-serving-node link, for transmission of a physical downlink shared channel (PDSCH), a physical downlink control channel (PDCCH), or a channel state information reference signal (CSI-RS);

(2) time-domain overlapping or frequency-domain overlapping between the first-serving-node link and the second-serving-node link, for transmission of a physical uplink shared channel (PUSCH), an SRS (Sounding Reference Signal, channel sounding reference signal), a physical uplink control channel (PUCCH), or a PRACH (Physical Random Access Channel, physical layer random access channel);

(3) time-domain overlapping or frequency-domain overlapping between transmission of at least one of a PUSCH, an SRS, a PUCCH, and a PRACH on the first-serving-node link and transmission of at least one of a PDSCH, a PDCCH, and a CSI-RS on the second-serving-node link;

(4) time-domain overlapping or frequency-domain overlapping between transmission of at least one of a PUSCH, an SRS, a PUCCH, and a PRACH on the second-serving-node link and transmission of at least one of a PDSCH, a PDCCH, and a CSI-RS on the first-serving-node link; and (5) time-domain overlapping or frequency-domain overlapping of downlink control information (DCI) search space between the first-serving-node link and the second-serving-node link.

In this embodiment, when the collision behavior is detected, it indicates that the first serving node collides with the second serving node in scheduling of the wireless node. Then, the wireless node may report collision type information and one or more of a system frame number, a slot index, and a symbol index involved in collision to the second serving node, and the second serving node determines how to avoid the collision, thereby reducing a probability of subsequent wireless-node scheduling collision.

It should be noted that, for the information transmission method provided by the embodiments of this application, the execution body may be an information transmission apparatus, or a control module for executing the information transmission method in the information transmission apparatus. In this embodiment of this application, the information transmission apparatus provided by the embodiments of this application is described by using the information transmission method being loaded by the information transmission apparatus as an example.

Figure 18:
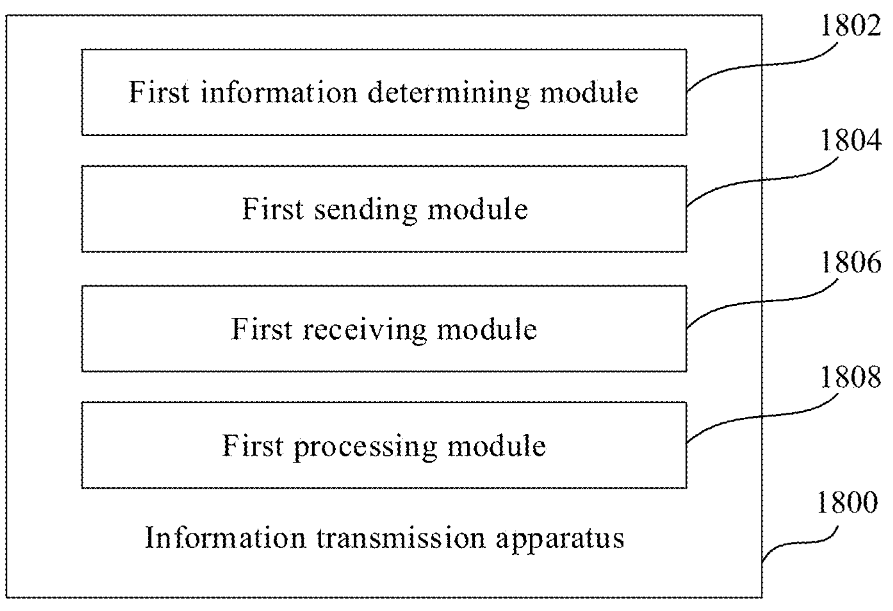
FIG. 18 is a first schematic structural diagram of an information transmission apparatus according to an embodiment of this application.

FIG. 18 is a possible schematic structural diagram of an information transmission apparatus applied to a first centralized unit according to an embodiment of this application. As shown in FIG. 18, the information transmission apparatus 1800 includes:

(1) a first information determining module 1802, configured to determine resource configuration coordination information; and (2) a first sending module 1804, configured to send a first message carrying the resource configuration coordination information to a second centralized unit.

In this embodiment, the first centralized unit determines the resource configuration coordination information for the first serving node DU of the wireless node and the second serving node DU of the wireless node, and further sends the resource configuration coordination information to the second centralized unit, so that the second centralized unit configures, based on the resource configuration coordination information, the resource for the second serving node added for the wireless node. This reduces or avoids a probability that the wireless node cannot correspondingly execute scheduling by the first serving node and the second serving node due to wireless-node scheduling collision between the first serving node and the second serving node that occurs after the second serving node acts as an SN of the wireless node, thereby improving wireless-node scheduling efficiency.

In some embodiments of this application, the wireless node includes an IAB node or UE. The IAB node includes an MT and a DU. To be specific, the method in this embodiment of this application is applicable to resource allocation coordination between two parent IAB-DUs when the two parent IAB-DUs belong to different CUs in a case of intra-frequency DC or intra-band inter-frequency DC in the IAB network, and the method is also applicable to dual connectivity for NR/LTE UEs under the same condition. In this embodiment of this application, resource allocation collision and scheduling collision between an MCG link and an SCG link of the UE or the MT can be reduced or avoided.

In some embodiments of this application, the resource configuration coordination information includes at least one of the following: a time-frequency resource for a distributed unit of the wireless node; time-frequency resource of the first serving node for scheduling the wireless node; a required minimum time-frequency resource of the first serving node for scheduling the wireless node; a time-frequency resource pool for the second serving node for scheduling the wireless node; a multiplexing scheduling mode between a first-serving-node connection link and a second-serving-node connection link that are for scheduling the wireless node; a multiplexing mode between a link from a wireless node to the first serving node and a link from the wireless node to the second serving node; link direction corresponding to a time-frequency resource; and a type indication of the time-frequency resource, where type information of the time-frequency resource includes hard, soft, and not available.

The foregoing information is sent to the second centralized unit, so that the second centralized unit can perform resource allocation for the second serving node based on the information, so as to reduce or avoid collision in scheduling the MT of the IAB node or the UE by the first serving node and the second serving node.

In some embodiments of this application, the first sending module 1804 is specifically configured to: in a case that the second serving node of the wireless node needs to be added, send the first message carrying the resource configuration coordination information to the second centralized unit.

In this embodiment, if the first centralized unit determines to add the second serving node for a wireless node after receiving a measurement report of surrounding wireless nodes from the wireless node (the measurement report may include signal quality from the second serving node to the wireless node), the first centralized unit sends the resource configuration coordination information when sending an addition request to the second centralized unit, that is, the first message may be an addition request sent by the first centralized unit to the second centralized unit, for indicating the second centralized unit to add the second serving node. According to this embodiment of this application, the second centralized unit is able to perform resource coordination configuration for the second serving node during addition of the second serving node, thereby reducing or avoiding resource collision between the second serving node and the first serving node during scheduling of the wireless node.

In some embodiments of this application, as shown in FIG. 18, the information transmission apparatus 1800 further includes:

(1) a first receiving module 1806, configured to receive a second message sent by the second centralized unit and obtain resource configuration information of a second serving node of a wireless node carried in the second message; and (2) a first processing module 1808, configured to adjust resource configuration information of a first serving node of the wireless node according to the resource configuration information of the second serving node.

In this embodiment, after configuring, based on the resource configuration coordination information, a resource for the second serving node added for the wireless node, the second centralized unit feeds back the resource configuration information of the second serving node to the first centralized unit. The first centralized unit may further adjust the resource configuration information of the first serving node based on the resource configuration information of the second serving node. In this way, it can be further ensured that the wireless-node scheduling resource of the first serving node does not collide with the wireless-node scheduling resource of the second serving node, thereby improving a wireless-node scheduling success rate.

In some embodiments of this application, the first receiving module 1806 is further configured to receive a third message sent by the wireless node and obtain resource collision information carried in the third message. The first processing module 1808 is further configured to adjust, based on the resource collision information, wireless-node scheduling or determines the resource configuration coordination information.

In this embodiment, the wireless node may assist in coordinating wireless-node scheduling resources between the first serving node and the second serving node. Specifically, if the wireless node detects collision of transmission resources scheduled by the first serving node and the second serving node, the wireless node may report the resource collision information to the first centralized unit, and further, the first centralized unit controls the first serving node to adjust wireless-node scheduling or re-determines the resource configuration coordination information, thereby reducing a probability of subsequent wireless-node scheduling collision.

In some embodiments of this application, the resource collision information includes resource collision type information and at least one of a system frame number, a slot index, or a symbol index. The resource collision type information includes at least one of the following:

(1) time-domain overlapping or frequency-domain overlapping between a first-serving-node link and a second-serving-node link, for transmission of a physical downlink shared channel (PDSCH), a physical downlink control channel (PDCCH), or a channel state information reference signal (CSI-RS);

(2) time-domain overlapping or frequency-domain overlapping between the first-serving-node link and the second-serving-node link, for transmission of a physical uplink shared channel (PUSCH), an SRS (Sounding Reference Signal, channel sounding reference signal), a physical uplink control channel (PUCCH), or a PRACH (Physical Random Access Channel, physical layer random access channel);

(3) time-domain overlapping or frequency-domain overlapping between transmission of at least one of a PUSCH, an SRS, a PUCCH, and a PRACH on the first-serving-node link and transmission of at least one of a PDSCH, a PDCCH, and a CSI-RS on the second-serving-node link;

(4) time-domain overlapping or frequency-domain overlapping between transmission of at least one of a PUSCH, an SRS, a PUCCH, and a PRACH on the second-serving-node link and transmission of at least one of a PDSCH, a PDCCH, and a CSI-RS on the first-serving-node link; and (5) time-domain overlapping or frequency-domain overlapping of downlink control information (DCI) search space between the first-serving-node link and the second-serving-node link.

In this embodiment, when the collision behavior is detected, it indicates that the first serving node collides with the second serving node in scheduling of the wireless node. Then, the wireless node may report collision type information and one or more of a system frame number, a slot index, and a symbol index involved in collision to the first centralized unit, and the first centralized unit determines how to avoid the collision, thereby reducing a probability of subsequent wireless-node scheduling collision.

Figure 19:
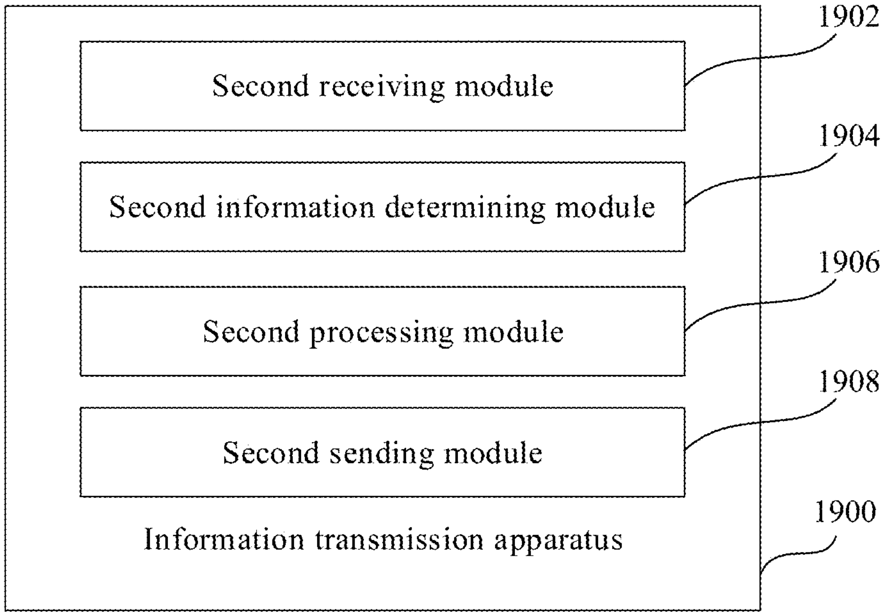
FIG. 19 is a second schematic structural diagram of an information transmission apparatus according to an embodiment of this application.

FIG. 19 is a possible schematic structural diagram of an information transmission apparatus applied to a second centralized unit according to an embodiment of this application. As shown in FIG. 19, the information transmission apparatus 1900 includes:

(1) a second receiving module 1902, configured to receive a first message sent by a first centralized unit;

(2) a second information determining module 1904, configured to obtain resource configuration coordination information carried in the first message; and (3) a second processing module 1906, configured to configure a resource for a second serving node of a wireless node based on the resource configuration coordination information.

In this embodiment, the second centralized unit receives the resource configuration coordination information sent by the first centralized unit, and further allocates, based on the resource configuration coordination information, a resource to the second serving node added for the wireless node. This reduces or avoids a probability that the wireless node cannot correspondingly execute scheduling by the first serving node and the second serving node due to wireless-node scheduling collision between the first serving node and the second serving node that occurs after the second serving node acts as an SN of the wireless node, thereby improving wireless-node scheduling efficiency.

In some embodiments of this application, the wireless node includes an IAB node or UE. The IAB node includes an MT and a DU. To be specific, the method in this embodiment of this application is applicable to resource allocation coordination between two parent IAB-DUs when the two parent IAB-DUs belong to different CUs in a case of intra-frequency DC or intra-band inter-frequency DC in the IAB network, and the method is also applicable to dual connectivity for NR/LTE UEs under the same condition. In this embodiment of this application, resource allocation collision and scheduling collision between an MCG link and an SCG link of the UE or the MT can be reduced or avoided.

In some embodiments of this application, the resource configuration coordination information includes at least one of the following: a time-frequency resource for a distributed unit of the wireless node; time-frequency resource of the first serving node for scheduling the wireless node; a required minimum time-frequency resource of the first serving node for scheduling the wireless node; a time-frequency resource pool for the second serving node for scheduling the wireless node; a multiplexing scheduling mode between a first-serving-node connection link and a second-serving-node connection link that are for scheduling the wireless node; a multiplexing mode between a link from a wireless node to the first serving node and a link from the wireless node to the second serving node; link direction corresponding to a time-frequency resource; and a type indication of the time-frequency resource, where type information of the time-frequency resource includes hard, soft, and not available.

The foregoing information is sent to the second centralized unit, so that the second centralized unit can perform resource allocation for the second serving node based on the information, so as to reduce or avoid collision in scheduling the MT of the IAB node or the UE by the first serving node and the second serving node.

In some embodiments of this application, as shown in FIG. 19, the information transmission apparatus 1900 further includes:

(1) a second sending module 1908, configured to send a second message carrying resource configuration information of the second serving node to the first centralized unit.

In this embodiment, after configuring, based on the resource configuration coordination information, the resource for the second serving node added for the wireless node, the second centralized unit feeds back the resource configuration information of the second serving node to the first centralized unit, so that the first centralized unit can further adjust the resource configuration information of the first serving node based on the resource configuration information of the second serving node. In this way, it can be further ensured that the wireless-node scheduling resource of the first serving node does not collide with the wireless-node scheduling resource of the second serving node, thereby improving a wireless-node scheduling success rate.

In some embodiments of this application, the second receiving module 1902 is further configured to receive a fourth message sent by the wireless node and obtain resource collision information carried in the fourth message. The second processing module 1906 is further configured to adjust, based on the resource collision information, wireless-node scheduling or configures a resource for the second serving node.

In this embodiment, the wireless node may assist in coordinating wireless-node scheduling resources between the first serving node and the second serving node. Specifically, if the wireless node detects collision of transmission resources scheduled by the first serving node and the second serving node, the wireless node may report the resource collision information to the second centralized unit, and further, the second centralized unit controls the second serving node to adjust scheduling of the wireless node or configures the resource for the second serving node, thereby reducing a probability of subsequent wireless-node scheduling collision.

In some embodiments of this application, the resource collision information includes resource collision type information and at least one of a system frame number, a slot index, or a symbol index. The resource collision type information includes at least one of the following:

(1) time-domain overlapping or frequency-domain overlapping between a first-serving-node link and a second-serving-node link, for transmission of a physical downlink shared channel (PDSCH), a physical downlink control channel (PDCCH), or a channel state information reference signal (CSI-RS);

(2) time-domain overlapping or frequency-domain overlapping between the first-serving-node link and the second-serving-node link, for transmission of a physical uplink shared channel (PUSCH), an SRS (Sounding Reference Signal, channel sounding reference signal), a physical uplink control channel (PUCCH), or a PRACH (Physical Random Access Channel, physical layer random access channel);

(3) time-domain overlapping or frequency-domain overlapping between transmission of at least one of a PUSCH, an SRS, a PUCCH, and a PRACH on the first-serving-node link and transmission of at least one of a PDSCH, a PDCCH, and a CSI-RS on the second-serving-node link;

(4) time-domain overlapping or frequency-domain overlapping between transmission of at least one of a PUSCH, an SRS, a PUCCH, and a PRACH on the second-serving-node link and transmission of at least one of a PDSCH, a PDCCH, and a CSI-RS on the first-serving-node link; and (5) time-domain overlapping or frequency-domain overlapping of downlink control information (DCI) search space between the first-serving-node link and the second-serving-node link.

In this embodiment, when the collision behavior is detected, it indicates that the first serving node collides with the second serving node in scheduling of the wireless node. Then, the wireless node may report collision type information and one or more of a system frame number, a slot index, and a symbol index involved in collision to the second centralized unit, and the second centralized unit determines how to avoid the collision, thereby reducing a probability of subsequent wireless-node scheduling collision.

Figure 20:
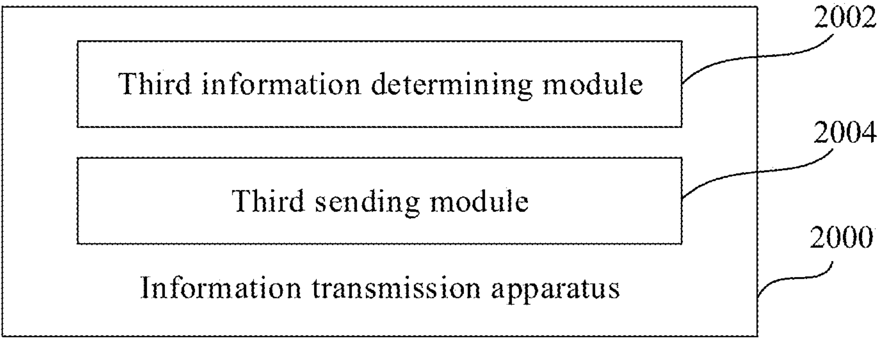
FIG. 20 is a third schematic structural diagram of an information transmission apparatus according to an embodiment of this application.

FIG. 20 is a possible schematic structural diagram of an information transmission apparatus applied to a wireless node according to an embodiment of this application. As shown in FIG. 20, the information transmission apparatus 2000 includes:

(1) a third information determining module 2002, configured to obtain resource collision information between a first serving node and a second serving node; and (2) a third sending module 2004, configured to send a third message carrying the resource collision information to a first centralized unit, or send a fourth message carrying the resource collision information to a second centralized unit, or send a fifth message carrying the resource collision information to the first serving node, or send a sixth message carrying the resource collision information to the second serving node.

In this embodiment, the wireless node may assist in coordinating wireless-node scheduling resources between the first serving node and the second serving node. Specifically, if the wireless node detects collision of transmission resources scheduled by the first serving node and the second serving node, the wireless node may report the resource collision information to the first serving node, the second serving node, the first centralized unit, or the second centralized unit, and further the first serving node, the second serving node, the first centralized unit, or the second centralized unit determines how to avoid the collision, thereby reducing a probability of subsequent wireless-node scheduling collision.

In some embodiments of this application, the wireless node includes an IAB node or UE. The IAB node includes an MT and a DU. To be specific, the method in this embodiment of this application is applicable to resource allocation coordination between two parent IAB-DUs when the two parent IAB-DUs belong to different CUs in a case of intra-frequency DC or intra-band inter-frequency DC in the IAB network, and the method is also applicable to dual connectivity of NR UEs or long term evolution (LTE) UEs under the same condition. In this embodiment of this application, resource allocation collision and scheduling collision between an MCG link and an SCG link of the UE or the MT can be reduced or avoided.

In some embodiments of this application, the resource collision information includes resource collision type information and at least one of a system frame number, a slot index, or a symbol index. The resource collision type information includes at least one of the following:

(1) time-domain overlapping or frequency-domain overlapping between a first-serving-node link and a second-serving-node link, for transmission of a physical downlink shared channel (PDSCH), a physical downlink control channel (PDCCH), or a channel state information reference signal (CSI-RS);

(2) time-domain overlapping or frequency-domain overlapping between the first-serving-node link and the second-serving-node link, for transmission of a physical uplink shared channel (PUSCH), an SRS (Sounding Reference Signal, channel sounding reference signal), a physical uplink control channel (PUCCH), or a PRACH (Physical Random Access Channel, physical layer random access channel);

(3) time-domain overlapping or frequency-domain overlapping between transmission of at least one of a PUSCH, an SRS, a PUCCH, and a PRACH on the first-serving-node link and transmission of at least one of a PDSCH, a PDCCH, and a CSI-RS on the second-serving-node link;

(4) time-domain overlapping or frequency-domain overlapping between transmission of at least one of a PUSCH, an SRS, a PUCCH, and a PRACH on the second-serving-node link and transmission of at least one of a PDSCH, a PDCCH, and a CSI-RS on the first-serving-node link; and (5) time-domain overlapping or frequency-domain overlapping of downlink control information (DCI) search space between the first-serving-node link and the second-serving-node link.

In this embodiment, when the collision behavior is detected, it indicates that the first serving node collides with the second serving node in scheduling of the wireless node. Then, the wireless node may report collision type information and one or more of a system frame number, a slot index, and a symbol index involved in collision to the first serving node, the second serving node, the first centralized unit, or the second centralized unit; and then the first serving node, the second serving node, the first centralized unit, or the second centralized unit determines how to avoid the collision, thereby reducing a probability of subsequent wireless-node scheduling collision.

Figure 21:
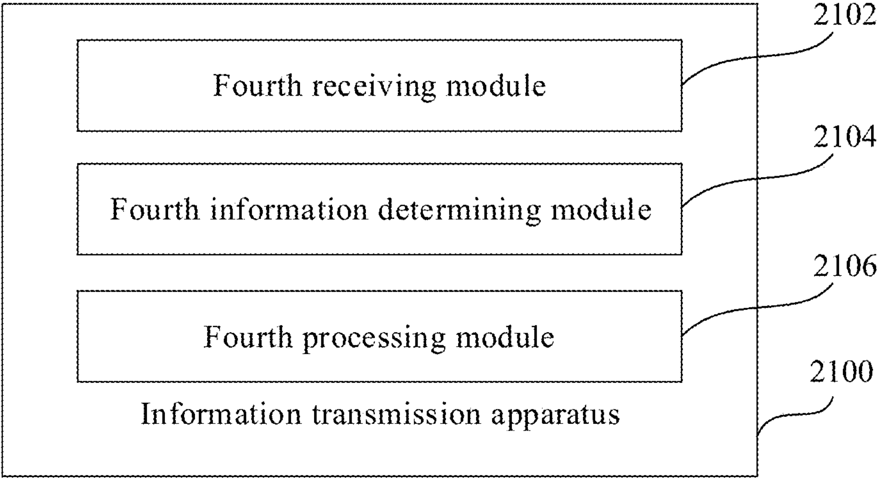
FIG. 21 is a fourth schematic structural diagram of an information transmission apparatus according to an embodiment of this application.

FIG. 21 is a possible schematic structural diagram of an information transmission apparatus applied to a first serving node according to an embodiment of this application. As shown in FIG. 21, the information transmission apparatus 2100 includes:

(1) a fourth receiving module 2102, configured to receive a fifth message sent by a wireless node;

(2) a fourth information determining module 2104, configured to obtain resource collision information that is with a second serving node and that is carried in the fifth message; and (3) a fourth processing module 2106, configured to adjust wireless-node scheduling based on the resource collision information.

In this embodiment, the wireless node may assist in coordinating wireless-node scheduling resources between the first serving node and the second serving node. Specifically, if the wireless node detects collision of transmission resources scheduled by the first serving node and the second serving node, the wireless node may report the resource collision information to the first serving node, and after receiving the resource collision information, the first serving node determines how to avoid the collision, thereby reducing a probability of subsequent wireless-node scheduling collision.

In some embodiments of this application, the wireless node includes an IAB node or UE. The IAB node includes an MT and a DU. To be specific, the method in this embodiment of this application is applicable to resource allocation coordination between two parent IAB-DUs when the two parent IAB-DUs belong to different CUs in a case of intra-frequency DC or intra-band inter-frequency DC in the IAB network, and the method is also applicable to dual connectivity for NR/LTE UEs under the same condition. In this embodiment of this application, resource allocation collision and scheduling collision between an MCG link and an SCG link of the UE or the MT can be reduced or avoided.

In some embodiments of this application, the resource collision information includes resource collision type information and at least one of a system frame number, a slot index, or a symbol index. The resource collision type information includes at least one of the following:

(1) time-domain overlapping or frequency-domain overlapping between a first-serving-node link and a second-serving-node link, for transmission of a physical downlink shared channel (PDSCH), a physical downlink control channel (PDCCH), or a channel state information reference signal (CSI-RS);

(2) time-domain overlapping or frequency-domain overlapping between the first-serving-node link and the second-serving-node link, for transmission of a physical uplink shared channel (PUSCH), an SRS (Sounding Reference Signal, channel sounding reference signal), a physical uplink control channel (PUCCH), or a PRACH (Physical Random Access Channel, physical layer random access channel);

(3) time-domain overlapping or frequency-domain overlapping between transmission of at least one of a PUSCH, an SRS, a PUCCH, and a PRACH on the first-serving-node link and transmission of at least one of a PDSCH, a PDCCH, and a CSI-RS on the second-serving-node link;

(4) time-domain overlapping or frequency-domain overlapping between transmission of at least one of a PUSCH, an SRS, a PUCCH, and a PRACH on the second-serving-node link and transmission of at least one of a PDSCH, a PDCCH, and a CSI-RS on the first-serving-node link; and (5) time-domain overlapping or frequency-domain overlapping of downlink control information (DCI) search space between the first-serving-node link and the second-serving-node link.

In this embodiment, when the collision behavior is detected, it indicates that the first serving node collides with the second serving node in scheduling of the wireless node. Then, the wireless node may report collision type information and one or more of a system frame number, a slot index, and a symbol index involved in collision to the first serving node, and the first serving node determines how to avoid the collision, thereby reducing a probability of subsequent wireless-node scheduling collision.

Figure 22:
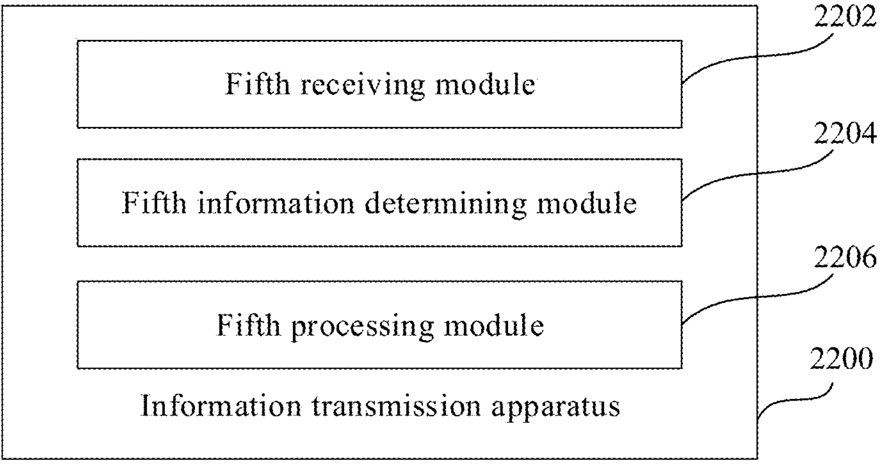
FIG. 22 is a fifth schematic structural diagram of an information transmission apparatus according to an embodiment of this application.

FIG. 22 is a possible schematic structural diagram of an information transmission apparatus applied to a second serving node according to an embodiment of this application. As shown in FIG. 22, the information transmission apparatus 2200 includes:

(1) a fifth receiving module 2202, configured to receive a sixth message sent by a wireless node;

(2) a fifth information determining module 2204, configured to obtain resource collision information that is with a first serving node and that is carried in the sixth message; and (3) a fifth processing module 2206, configured to adjust wireless-node scheduling based on the resource collision information.

In this embodiment, the wireless node may assist in coordinating wireless-node scheduling resources between the first serving node and the second serving node. Specifically, if the wireless node detects collision of transmission resources scheduled by the first serving node and the second serving node, the wireless node may report the resource collision information to the second serving node, and after receiving the resource collision information, the second serving node determines how to avoid the collision, thereby reducing a probability of subsequent wireless-node scheduling collision.

In some embodiments of this application, the wireless node includes an IAB node or UE. The IAB node includes an MT and a DU. To be specific, the method in this embodiment of this application is applicable to resource allocation coordination between two parent IAB-DUs when the two parent IAB-DUs belong to different CUs in a case of intra-frequency DC or intra-band inter-frequency DC in the IAB network, and the method is also applicable to dual connectivity for NR/LTE UEs under the same condition. In this embodiment of this application, resource allocation collision and scheduling collision between an MCG link and an SCG link of the UE or the MT can be reduced or avoided.

In some embodiments of this application, the resource collision information includes resource collision type information and at least one of a system frame number, a slot index, or a symbol index. The resource collision type information includes at least one of the following:

(1) time-domain overlapping or frequency-domain overlapping between a first-serving-node link and a second-serving-node link, for transmission of a physical downlink shared channel (PDSCH), a physical downlink control channel (PDCCH), or a channel state information reference signal (CSI-RS);

(2) time-domain overlapping or frequency-domain overlapping between the first-serving-node link and the second-serving-node link, for transmission of a physical uplink shared channel (PUSCH), an SRS (Sounding Reference Signal, channel sounding reference signal), a physical uplink control channel (PUCCH), or a PRACH (Physical Random Access Channel, physical layer random access channel);

(3) time-domain overlapping or frequency-domain overlapping between transmission of at least one of a PUSCH, an SRS, a PUCCH, and a PRACH on the first-serving-node link and transmission of at least one of a PDSCH, a PDCCH, and a CSI-RS on the second-serving-node link;

(4) time-domain overlapping or frequency-domain overlapping between transmission of at least one of a PUSCH, an SRS, a PUCCH, and a PRACH on the second-serving-node link and transmission of at least one of a PDSCH, a PDCCH, and a CSI-RS on the first-serving-node link; and (5) time-domain overlapping or frequency-domain overlapping of downlink control information (DCI) search space between the first-serving-node link and the second-serving-node link.

In this embodiment, when the collision behavior is detected, it indicates that the first serving node collides with the second serving node in scheduling of the wireless node. Then, the wireless node may report collision type information and one or more of a system frame number, a slot index, and a symbol index involved in collision to the second serving node, and the second serving node determines how to avoid the collision, thereby reducing a probability of subsequent wireless-node scheduling collision.

The information transmission apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The information transmission apparatus in this embodiment of this application may be an apparatus with an operating system. The operating system may be an Android operating system, an iOS operating system, or other possible operating systems, and is not specifically limited in the embodiments of this application.

The information transmission apparatus provided in this embodiment of this application is capable of implementing the processes of the information transmission method embodiments in FIG. 7 to FIG. 17, with the same technical effects achieved. To avoid repetition, details are not described herein again.

Optionally, an embodiment of this application further provides an electronic device 2300, including a processor 2320, a memory 2318, and a program or an instruction stored in the memory 2318 and capable of running on the processor 2320. When the program or the instructions are executed by the processor 2320, the processes of the foregoing embodiment of the information transmission method are implemented, with the same technical effects achieved. To avoid repetition, details are not described herein again.

It should be noted that the electronic device in this embodiment of this application includes the aforementioned mobile electronic device and non-mobile electronic device.

Figure 23:
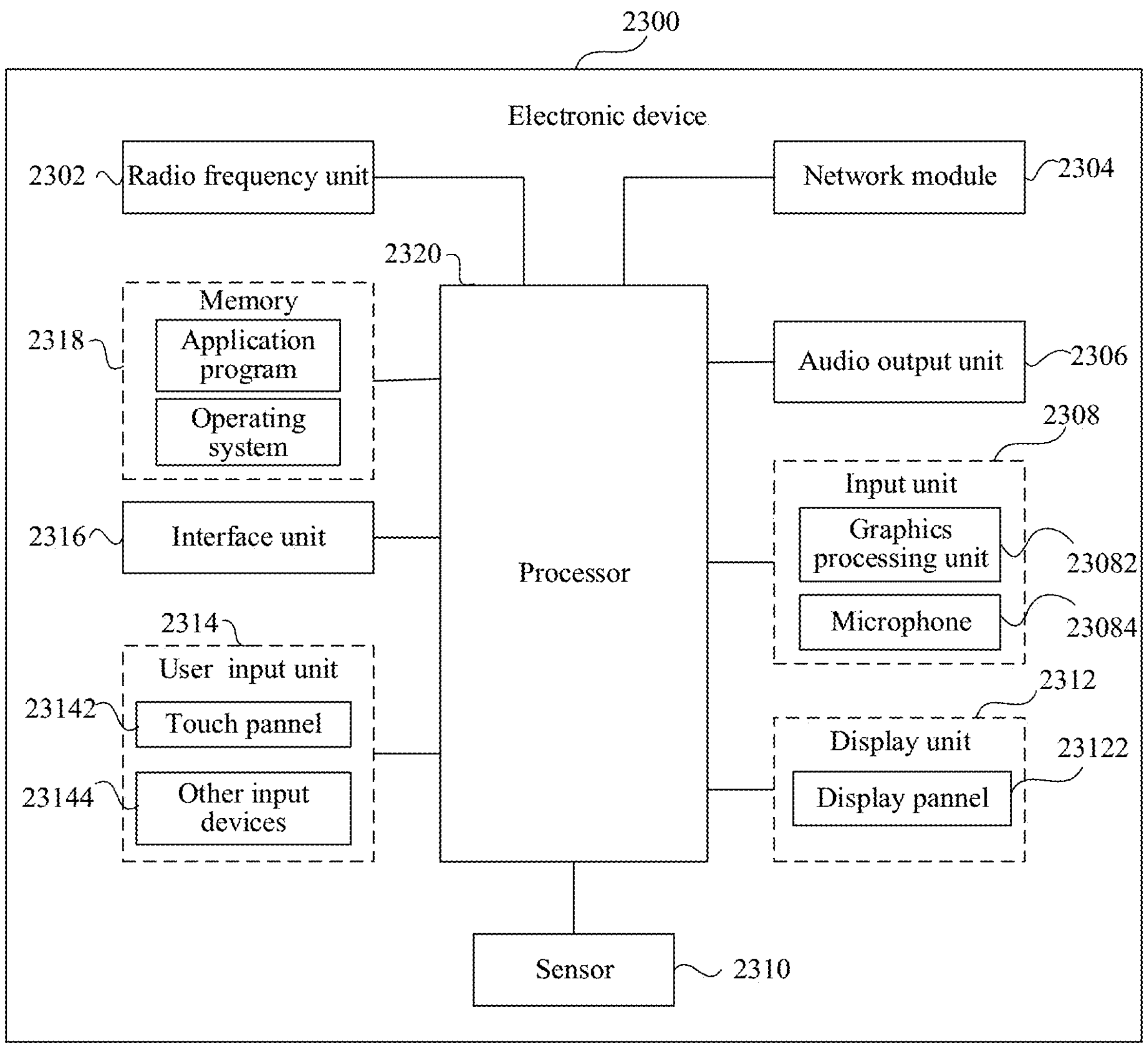
FIG. 23 is a schematic structural diagram of an electronic device according to an embodiment of this application.

FIG. 23 is a schematic diagram of a hardware structure of an electronic device 2300 for implementing the embodiments of this application.

The electronic device 2300 includes but is not limited to components such as a radio frequency unit 2302, a network module 2304, an audio output unit 2306, an input unit 2308, a sensor 2310, a display unit 2312, a user input unit 2314, an interface unit 2316, a memory 2318, and a processor 2320.

A person skilled in the art can understand that the electronic device 2300 may further include a power supply (for example, a battery) supplying power to all components, and the power supply may be logically connected to the processor 2320 through a power management system. In this way, functions such as charge management, discharge management, and power consumption management are implemented by using the power management system. The structure of the electronic device shown in FIG. 23 does not constitute any limitation on the electronic device. The electronic device may include more or fewer components than shown in the figure, or a combination of some components, or the components disposed differently. Details are not repeated herein.

According to a first aspect of this embodiment, the processor 2320 is configured to determine resource configuration coordination information, and the radio frequency unit 2302 is configured to send a first message carrying the resource configuration coordination information to a second centralized unit.

In this embodiment, a first centralized unit determines resource configuration coordination information for a first serving node DU of a wireless node and a second serving node DU of the wireless node, and further sends the resource configuration coordination information to the second centralized unit, so that the second centralized unit configures, based on the resource configuration coordination information, the resource for the second serving node added for the wireless node. This reduces or avoids a probability that the wireless node cannot correspondingly execute scheduling by the first serving node and the second serving node due to wireless-node scheduling collision between the first serving node and the second serving node that occurs after the second serving node acts as an SN of the wireless node, thereby improving wireless-node scheduling efficiency.

Further, the radio frequency unit 2302 is specifically configured to: in a case that the second serving node of the wireless node needs to be added, send the first message carrying the resource configuration coordination information to the second centralized unit.

Further, the radio frequency unit 2302 is further configured to: receive a second message sent by the second centralized unit; obtain resource configuration information of the second serving node of the wireless node carried in the second message; and the processor 2320 is further configured to adjust resource configuration information of the first serving node of the wireless node based on the resource configuration information of the second serving node.

Further, the radio frequency unit 2302 is further configured to: receive a third message sent by the wireless node, and the processor 2320 is further configured to obtain resource collision information carried in the third message, and then adjust, based on the resource collision information, wireless-node scheduling or determines the resource configuration coordination information.

According to a second aspect of this embodiment, the radio frequency unit 2302 is configured to: receive a first message sent by the first centralized unit, and the processor 2320 is further configured to obtain resource configuration coordination information carried in the first message, and then configures, based on the resource configuration coordination information, a resource for the second serving node of the wireless node.

In this embodiment, the second centralized unit receives the resource configuration coordination information sent by the first centralized unit, and further allocates, based on the resource configuration coordination information, a resource to the second serving node added for the wireless node. This reduces or avoids a probability that the wireless node cannot correspondingly execute scheduling by the first serving node and the second serving node due to wireless-node scheduling collision between the first serving node and the second serving node that occurs after the second serving node acts as an SN of the wireless node, thereby improving wireless-node scheduling efficiency.

Further, the radio frequency unit 2302 is further configured to: send a second message carrying resource configuration information of the second serving node to the first centralized unit.

Further, the radio frequency unit 2302 is further configured to: receive a fourth message sent by the wireless node, and the processor 2320 is further configured to obtain resource collision information carried in the fourth message, and then adjust, based on the resource collision information, wireless-node scheduling or configure a resource for the second serving node.

According to a third aspect of this embodiment, the processor 2320 is configured to obtain resource collision information between the first serving node and the second serving node, and the radio frequency unit 2302 is configured to: send a third message carrying the resource collision information to the first centralized unit, or send a fourth message carrying the resource collision information to the second centralized unit, or send a fifth message carrying the resource collision information to the first serving node, or send a sixth message carrying the resource collision information to the second serving node.

In this embodiment, the wireless node may assist in coordinating wireless-node scheduling resources between the first serving node and the second serving node. Specifically, if the wireless node detects collision of transmission resources scheduled by the first serving node and the second serving node, the wireless node may report the resource collision information to the first serving node, the second serving node, the first centralized unit, or the second centralized unit, and further the first serving node, the second serving node, the first centralized unit, or the second centralized unit determines how to avoid the collision, thereby reducing a probability of subsequent wireless-node scheduling collision.

According to a fourth aspect of this embodiment, the radio frequency unit 2302 is configured to receive a fifth message sent by the wireless node, and the processor 2320 is configured to obtain resource collision information that is between the first serving node and the second serving node and that is carried in the fifth message, and then adjust wireless-node scheduling based on the resource collision information.

According to a fifth aspect of this embodiment, the radio frequency unit 2302 is configured to receive a sixth message sent by the wireless node, and the processor 2320 is configured to obtain resource collision information that is between the second serving node and the first serving node and that is carried in the sixth message, and then adjust wireless-node scheduling based on the resource collision information.

It should be understood that in this embodiment of this application, the radio frequency unit 2302 may be configured to receive and send information, or to receive and send a signal in a call process, and specially, receive downlink data from a base station or send uplink data to the base station. The radio frequency unit 2302 includes but is not limited to an antenna, at least one amplifier, a transceiver, a coupler, a low noise amplifier, a duplexer, and the like.

The network module 2304 provides a user with wireless broadband internet access, for example, helping the user to transmit and receive e-mails, browse web pages, and access streaming media.

The audio output unit 2306 may convert audio data received by the radio frequency unit 2302 or the network module 2304 or stored in the memory 2318 into an audio signal, and output the audio signal as a sound. Furthermore, the audio output unit 2306 may also provide audio output (for example, a call signal received sound or a message received sound) related to a specific function performed by the electronic device 2300. The audio output unit 2306 includes a speaker, a buzzer, a receiver, and the like.

The input unit 2308 is configured to receive an audio or video signal. The input unit 2308 may include a graphics processing unit (GPU) 23082 and a microphone 23084. The graphics processing unit 23082 processes image data of a still picture or video obtained by an image capture apparatus (such as a camera) in a video capture mode or an image capture mode. The image frame processed may be displayed on the display unit 2312, or stored in the memory 2318 (or another storage medium), or be transmitted via the radio frequency unit 2302 or the network module 2304. The microphone 23084 is capable of receiving sounds and processing such sounds into audio data. The processed audio data may be converted in a telephone call mode into a format that can be transmitted by the radio frequency unit 2302 to a mobile communications base station, for outputting.

The electronic device 2300 may further include at least one sensor 2310, for example, a fingerprint sensor, a pressure sensor, an iris sensor, a molecular sensor, a gyroscope, a barometer, a hygrometer, a thermometer, an infrared sensor, an optical sensor, a motion sensor, and other sensors.

The display unit 2312 is configured to display information input by the user or information provided to the user. The display unit 2312 may include a display panel 23122, and the display panel 23122 may be configured in a form of a liquid crystal display, an organic light-emitting diode, and the like The user input unit 2314 may be configured to receive input digit or character information and generate key signal input related to user setting and function control of the user equipment. Specifically, the user input unit 2314 may include a touch panel 23142 and other input devices 23144. The touch panel 23142 is also referred to as a touchscreen and can collect a touch operation of the user on or near the touch panel. The touch panel 23142 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, transmits the point coordinates to the processor 2320, and receives and executes a command transmitted by the processor 2320. The other input devices 23144 may include but are not limited to a physical keyboard, a function key (such as a volume control key or a power on/off key), a trackball, a mouse, a joystick, and the like. Details are not described herein.

Further, the touch panel 23142 may cover the display panel 23122. When detecting a touch operation on or near the touch panel 23142, the touch panel 23142 transmits the touch operation to the processor 2320 to determine a type of a touch event. Then, the processor 2320 provides a corresponding visual output on the display panel 23122 based on the type of the touch event. The touch panel 23142 and the display panel 23122 may act as two independent parts or may be integrated in one component.

The interface unit 2316 is an interface between an external apparatus and the electronic device 2300. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 2316 may be configured to: receive input (for example, data information and power) from the external apparatus, and transmit the received input to one or more elements in the electronic device 2300, or may be configured to transmit data between the electronic device 2300 and the external apparatus.

The memory 2318 may be configured to store software programs and various data. The memory 2318 may mainly include a program storage area and a data storage area. The program storage area may store an operating system, and an application program required by at least one function (for example, a sound playback function or an image playback function). The data storage area may store data (for example, audio data or a phone book) created according to use of the mobile terminal. In addition, the memory 2318 may include a high-speed random access memory, and may further include a non-volatile memory such as a disk storage device, a flash memory device, or another volatile solid-state storage device.

The processor 2320 executes various functions and processing data of the electronic device 2300 by running or executing software programs and/or modules stored in the memory 2318 and invoking data stored in the memory 2318, so as to perform overall monitoring on the electronic device 2300. The processor 2320 may include one or more processing units. An application processor and a modem processor may be integrated in the processor 2320. The application processor primarily processes an operating system, user interfaces, application programs, and the like. The modem processor primarily processes radio communication.

An embodiment of this application further provides a readable storage medium, where a program or an instruction is stored in the readable storage medium. When the program or the instructions are executed by a processor, the processes of the foregoing embodiment of the information transmission method can be implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the information transmission method, with the same technical effects achieved. To avoid repetition, details are not described herein again. It should be understood that the chip mentioned in the embodiments of this application may also be referred to as a system-level chip, a system chip, a chip system, a system-on-chip, or the like.

It should be noted that the terms “include”, “comprise”, or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by “includes a . . . ” does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An information transmission method, comprising:

determining, by a first centralized unit, resource configuration coordination information; and sending, by the first centralized unit, a first message carrying the resource configuration coordination information to a second centralized unit;

wherein a first serving node and a second serving node are configured to schedule a same wireless node, the first serving node is controlled by the first centralized unit, and the second serving node is controlled by the second centralized unit;

wherein the resource configuration coordination information comprises:

a time-frequency resource of the first serving node for scheduling the wireless node;

a duplexing mode between a link from the wireless node to the first serving node that is for scheduling the wireless node and a link from the wireless node to the second serving node that is for scheduling the wireless node; and a link direction corresponding to a time-frequency resource.

2. The information transmission method according to claim 1, wherein the method further comprises:

receiving, by the first centralized unit, a second message sent by the second centralized unit;

obtaining, by the first centralized unit, resource configuration information of the second serving node of a wireless node carried in the second message; and adjusting, by the first centralized unit, resource configuration information of the first serving node of the wireless node according to the resource configuration information of the second serving node.

3. The information transmission method according to claim 2, wherein the sending, by the first centralized unit, a first message carrying the resource configuration coordination information to a second centralized unit comprises:

in a case that the second serving node of the wireless node needs to be added, sending, by the first centralized unit, the first message carrying the resource configuration coordination information to the second centralized unit.

4. The information transmission method according to claim 2, further comprising:

receiving, by the first centralized unit, a third message sent by the wireless node;

obtaining, by the first centralized unit, resource collision information carried in the third message; and adjusting, by the first centralized unit based on the resource collision information, wireless-node scheduling or determining the resource configuration coordination information.

5. The information transmission method according to claim 4, wherein the resource collision information comprises resource collision type information and at least one of a system frame number, a slot index, or a symbol index.

6. The information transmission method according to claim 5, wherein the resource collision type information comprises at least one of the following:

time-domain overlapping or frequency-domain overlapping between a first-serving-node link and a second-serving-node link, for transmission of a physical downlink shared channel, a physical downlink control channel, or a channel state information reference signal;

time-domain overlapping or frequency-domain overlapping between the first-serving-node link and the second-serving-node link, for transmission of a physical uplink shared channel, a channel sounding reference signal, a physical uplink control channel, or a physical layer random access channel;

time-domain overlapping or frequency-domain overlapping between transmission of at least one of a physical uplink shared channel, a channel sounding reference signal, a physical uplink control channel, or a physical layer random access channel on the first-serving-node link and transmission of at least one of a physical downlink shared channel, a physical downlink control channel, or a channel state information reference signal on the second-serving-node link;

time-domain overlapping or frequency-domain overlapping between transmission of at least one of a physical uplink shared channel, a channel sounding reference signal, a physical uplink control channel, or a physical layer random access channel on the second-serving-node link and transmission of at least one of a physical downlink shared channel, a physical downlink control channel, or a channel state information reference signal on the first-serving-node link; or, time-domain overlapping or frequency-domain overlapping of downlink control information search space between the first-serving-node link and the second-serving-node link.

7. The information transmission method according to claim 2, wherein:

the wireless node comprises an integrated access backhaul node or a user terminal.

8. The information transmission method according to claim 1, wherein the resource configuration coordination information further comprises at least one of the following:

a time-frequency resource for a distributed unit of the wireless node;

a required minimum time-frequency resource of the first serving node for scheduling the wireless node;

a time-frequency resource pool for the second serving node for scheduling the wireless node; or, a type indication of the time-frequency resource, wherein type information of the time-frequency resource comprises hard, soft, and not available.

9. An electronic device, comprising a processor, a memory, and a program or instructions stored in the memory and capable of running on the processor, wherein the program or the instructions, when executed by the processor, cause the electronic device to implement the steps of the information transmission method according to claim 1.

10. An information transmission method, comprising:

receiving, by a second centralized unit, a first message sent by a first centralized unit;

obtaining, by the second centralized unit, resource configuration coordination information carried in the first message; and configuring, by the second centralized unit, a resource for a second serving node of a wireless node based on the resource configuration coordination information;

wherein a first serving node and a second serving node are configured to schedule a same wireless node, the first serving node is controlled by the first centralized unit, and the second serving node is controlled by the second centralized unit;

wherein the resource configuration coordination information comprises:

a time-frequency resource of the first serving node for scheduling the wireless node;

a duplexing mode between a link from the wireless node to the first serving node that is for scheduling the wireless node and a link from the wireless node to the second serving node that is for scheduling the wireless node; and a link direction corresponding to a time-frequency resource.

11. The information transmission method according to claim 10, wherein the method further comprises:

sending, by the second centralized unit, a second message carrying resource configuration information of the second serving node to the first centralized unit.

12. The information transmission method according to claim 10, wherein the resource configuration coordination information further comprises at least one of the following:

a time-frequency resource for a distributed unit of the wireless node;

a required minimum time-frequency resource of the first serving node for scheduling the wireless node;

a time-frequency resource pool for the second serving node for scheduling the wireless node; or a type indication of the time-frequency resource, wherein type information of the time-frequency resource comprises hard, soft, and not available.

13. The information transmission method according to claim 10, further comprising:

receiving, by the second centralized unit, a fourth message sent by the wireless node;

obtaining, by the second centralized unit, resource collision information carried in the fourth message; and adjusting, by the second centralized unit based on the resource collision information, wireless-node scheduling or configuring a resource for the second serving node.

14. The information transmission method according to claim 13, wherein the resource collision information comprises resource collision type information and at least one of a system frame number, a slot index, or a symbol index.

15. The information transmission method according to claim 14, wherein the resource collision type information comprises at least one of the following:

time-domain overlapping or frequency-domain overlapping between a first-serving-node link and a second-serving-node link, for transmission of a physical downlink shared channel, a physical downlink control channel, or a channel state information reference signal that are of the wireless node;

time-domain overlapping or frequency-domain overlapping between the first-serving-node link and the second-serving-node link, for transmission of a physical uplink shared channel, a channel sounding reference signal, a physical uplink control channel, or a physical layer random access channel;

time-domain overlapping or frequency-domain overlapping between transmission of at least one of a physical uplink shared channel, a channel sounding reference signal, a physical uplink control channel, or a physical layer random access channel on the first-serving-node link and transmission of at least one of a physical downlink shared channel, a physical downlink control channel, or a channel state information reference signal on the second-serving-node link;

time-domain overlapping or frequency-domain overlapping between transmission of at least one of a physical uplink shared channel, a channel sounding reference signal, a physical uplink control channel, or a physical layer random access channel on the second-serving-node link and transmission of at least one of a physical downlink shared channel, a physical downlink control channel, or a channel state information reference signal on the first-serving-node link; or, time-domain overlapping or frequency-domain overlapping of downlink control information search space between the first-serving-node link and the second-serving-node link.

16. An electronic device, comprising a processor, a memory, and a program or instructions stored in the memory and capable of running on the processor, wherein the program or the instructions, when executed by the processor, cause the electronic device to implement the steps of the information transmission method according to claim 10.

17. An information transmission method, comprising:

obtaining, by a wireless node, resource collision information between a first serving node and a second serving node; and sending, by the wireless node, a third message carrying the resource collision information to a first centralized unit, or sending a fourth message carrying the resource collision information to a second centralized unit, or sending a fifth message carrying the resource collision information to the first serving node, or sending a sixth message carrying the resource collision information to the second serving node;

wherein the first serving node and the second serving node are configured to schedule the same wireless node, the first serving node is controlled by the first centralized unit, and the second serving node is controlled by the second centralized unitunit;

wherein the resource collision information comprises resource collision type information and at least one of a system frame number, a slot index, or a symbol index.

18. The information transmission method according to claim 15, wherein the resource collision type information comprises at least one of the following:

time-domain overlapping or frequency-domain overlapping between a first-serving-node link and a second-serving-node link, for transmission of a physical downlink shared channel, a physical downlink control channel, or a channel state information reference signal;

time-domain overlapping or frequency-domain overlapping between the first-serving-node link and the second-serving-node link, for transmission of a physical uplink shared channel, a channel sounding reference signal, a physical uplink control channel, or a physical layer random access channel;

time-domain overlapping or frequency-domain overlapping between transmission of at least one of a physical uplink shared channel, a channel sounding reference signal, a physical uplink control channel, or a physical layer random access channel on the first-serving-node link and transmission of at least one of a physical downlink shared channel, a physical downlink control channel, or a channel state information reference signal on the second-serving-node link;

time-domain overlapping or frequency-domain overlapping between transmission of at least one of a physical uplink shared channel, a channel sounding reference signal, a physical uplink control channel, or a physical layer random access channel on the second-serving-node link and transmission of at least one of a physical downlink shared channel, a physical downlink control channel, or a channel state information reference signal on the first-serving-node link; or, time-domain overlapping or frequency-domain overlapping of downlink control information search space between the first-serving-node link and the second-serving-node link.

19. An electronic device, comprising a processor, a memory, and a program or instructions stored in the memory and capable of running on the processor, wherein the program or the einstructions, when executed by the processor, cause the electronic device to implement the steps of the information transmission method according to claim 17.

* * * * *